(12) United States Patent
Tan et al.

(10) Patent No.: US 6,542,549 B1
(45) Date of Patent: Apr. 1, 2003

(54) METHOD AND MODEL FOR REGULATING THE COMPUTATIONAL AND MEMORY REQUIREMENTS OF A COMPRESSED BITSTREAM IN A VIDEO DECODER

(75) Inventors: Thiow Keng Tan, Singapore (SG); Guo Rong Hu, Mountain View, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/417,465

(22) Filed: Oct. 12, 1999

(30) Foreign Application Priority Data

Oct. 13, 1998 (JP) ............................................. 10-328767
Feb. 19, 1999 (JP) ............................................. 10-041406

(51) Int. Cl.[7] ............................ H04B 1/66; G06K 9/46; H04N 7/12

(52) U.S. Cl. .................. 375/240.26; 382/243; 382/305; 348/419.1

(58) Field of Search ....................... 375/240.03, 240.05, 375/240.06, 240.15, 240.16, 240.24, 240.25; 348/699, 419.1, 423.1, 425.1; 382/239, 243, 305; 714/798; 358/1.9, 426.03, 426.12

(56) References Cited

U.S. PATENT DOCUMENTS

| 5,038,209 | A | | 8/1991 | Hang | |
| 5,307,177 | A | * | 4/1994 | Shibata et al. | 375/240.24 |
| 5,347,446 | A | * | 9/1994 | Iino et al. | 700/29 |
| 5,677,969 | A | * | 10/1997 | Auyeung et al. | 375/240.05 |
| 5,686,963 | A | * | 11/1997 | Uz et al. | 375/240.06 |
| 5,719,632 | A | * | 2/1998 | Hoang et al. | 375/240.05 |
| 5,742,623 | A | * | 4/1998 | Nuber et al. | 714/789 |
| 5,818,536 | A | * | 10/1998 | Morris et al. | 375/240.15 |
| 6,148,107 | A | * | 11/2000 | Ducloux et al. | 375/240.16 |

FOREIGN PATENT DOCUMENTS

| WO | 97/17492 | 6/1996 |
| WO | 97/47139 | 12/1997 |

* cited by examiner

Primary Examiner—Gims S. Philippe
(74) Attorney, Agent, or Firm—Greenblum & Bernstein, P.L.C.

(57) ABSTRACT

An apparatus for the verification of compressed objected-oriented video bitstream includes a set of verifier models: Video Complexity Verifier (VCV), Video memory Verifier (VMV) and Video Presentation Verifier (VPV). The models specify the behavior of a decoder for variable VOP size and rate and define new parameters and bounds to measure and verify the computational and memory resources that the bitstream demands. They can be used in the video encoder or in the verification of pre-compressed video distribution.

28 Claims, 21 Drawing Sheets

METHOD AND MODEL FOR REGULATING THE COMPUTATIONAL AND MEMORY REQUIREMENTS OF A COMPRESSED BITSTREAM IN A VIDEO DECODER

BACKGROUND OF THE INVENTION

1. Field of the Invention

The present invention relates method and model for regulating the computational and memory requirements of a compressed bitstream in a video decoder. This invention is useful in the field of multimedia audio-visual coding and compression techniques where the encoder needs to regulate the complexity requirements of the bitstreams it generates. This ensures that decoders conforming to the complexity specification of the standard can successfully decode these bitstreams without running short of resources.

2. Description of the Related Art

In the past, implementers of video decoders that conform to a certain performance capability of a standard are required to ensure that the decoders have sufficient resources to support the worse case scenario that is possible according to the specification. This is not a good engineering practice as usually the worse case scenario represents a case that almost impossible under normal operating conditions. This leads to over engineering and a waste of resources.

Currently within the MPEG-4 standardization, there is an effort to specify complexity bounds for the decoder based on the complexity of the bitstream rather than the worse case scenario. This is a statistical method based on a common unit of complexity measure. The standard will specify a fixed value for the maximum complexity allowed in a compliant bitstream. The decoder is required to provide resources sufficient to decode all compliant bitstreams. The encoder is required to ensure that all bitstreams that are generated do not exceed the maximum complexity bounds and are therefore complaint.

FIG. 1 shows graphically the above concept. In FIG. 1, valid bitstreams are distributed to the left of the fixed value of the standard and all compliant encoder are distributed to the right of the fixed value of the standard. The complexity bound is indicated by the straight line in the graph. The abscissa is given in complexity units. On the left of the line are all the conformant bitstreams. The typical distribution of the bitstream is depicted here. The majority of the bitstreams would have a complexity that is much lower than the complexity bound. A few bitstreams will approach this bound. When a bitstream exceeds this bound it is no longer a conformant bitstream and therefore not shown. On the right side of the complexity bound is the distribution of decoders. Most decoders would be designed as closed to the complexity bound as possible in order to save cost. A few decoders may have more resources that are required and these lie further to the right of the graph. A decoder that does not have enough resources to satisfy the complexity requirements of a compliant bitstream will lie to the left of the complexity bound and will be considered non-compliant.

FIG. 2 show a simple complexity measure method where the encoder counts the number of each macroblock type selected and evaluates the complexity of the bitstream based on some predefined cost function given to each of the macroblock type. FIG. 2 shows a simple method of counting the cost function of the bitstream being generated by calculating the equivalent I-MB units. However, this has the problem of not being able to give the instantaneous complexity measure and does not consider other resource such as memory. Information about the current macroblock is passed to the Macroblock Type Decision, module 201, where the decision to encode the macroblock in a particular method is made. This decision is then counted by the Cost Function Generator, module 202, which converts this information into a complexity cost function. The complexity cost function is then fed back to the Macroblock Type Decision module for the future decision.

Modules, 203 to 210 are the typical modules required for a hybrid transform coder. The input picture is partitioned into blocks that are processed by the motion estimation and compensation modules 210 and 209, respectively. Note that this step is skipped if there is no motion prediction. The motion compensated difference signal is then processed by the DCT transform module 203. The transform coefficients are then Quantized in the Quantization module 204, The quantized coefficients are then entropy coded together with the overhead information of the macroblock type and motion vectors in the Variable Length Coding module 205. The local decoder comprising of modules 206 to 209 reconstructs the coded picture for use in prediction of future pictures. The Inverse Quantization, module 206, inverse quantizes the coefficients before it is fed into the Inverse DCT, module 207, where the difference signal is recovered. The difference signal is then added with the motion prediction to form the reconstructed block. These blocks are then stored in the Frame Memory, module 208, for future use.

Also, in video coding it is inherent that the compression process results in a variable bitrate bitstream. This bitstream is commonly sent over a constant bitrate channel. In order to absorb the instantaneous variation in the bitrate it is common to introduce buffers at the output of the encoder and at the input of the decoder. These buffers serve as reservoir for bits and allow a constant bitrate channel to be connected to an encoder that generates variable bitrate bitstreams as well as to a decoder that consumes bitstreams at a variable bitrate.

The buffer occupancy changes in time, because the rate at which the buffer is being filled and the rate at which it is being emptied are different. However, over a long period of time, the average rate for filling the buffer and the average rate of emptying the buffer can be defined to be the same. Therefore, if we allow a large enough buffer the steady state operation can be achieved. To work correctly the buffer must not become empty (underflow) or be totally filled up (overflow). In order to ensure this constraint, models of the buffer have been presented in the literature such as MPEG-1 and MPEG-2 where the video buffer model allow the behaviour of the variable bitrate decoder connected to a constant bitrate channel. The remainder of the decoder does not need to be model because the video decoding method has been defined at a constant frame rate and each frame having a constant size. Therefore, the constant rate of decoding and the consumption of buffer are well defined in time and the video buffering verifier (VBV) is used to verify whether the buffer memory required in a decoder is less than the defined buffer size by checking the bitstream with its delivery rate function, R(t).

Defining the complexity measure is not sufficient to ensure that the decoder can be designed in a unambiguous way. There are two reasons for this.

The first reason is that the complexity is measured in time. Since the time is sufficiently large, it can accommodate several frames of pictures. The complexity distribution may be such that the resources of the decoder may be exhausted in the instantaneous time while the average complexity is below the limit set. Restricting the window to a shorter time would then restrict the variability of the complexity of the pictures. This means that all pictures must have the constant complexity. This is not good since by the nature of the coding modes different picture types should have different complexities.

The second reason is that the complexity is not just related to the computation time. A second element, which is not captured in the complexity measure, is the memory requirements.

The problem to be solved is therefore to invent a method for regulating the complexity requirements of the bitstream in terms of computational and memory requirements.

Also, in recent developments in the video compression process, a more flexible encoding method that is object oriented has been defined by MPEG. This flexible encoding scheme supports variable number of macroblocks within a video picture and different picture rate such that the rate of decoding and the rate of consumption of the memory are no longer constant. It becomes necessary to measure these rates over time to ensure them not violate the maximum capability of the decoder.

Also, the problem to be solve is how to define new verifiers and algorithms to measure the parameters of a compressed video bitstream to ensure the generated bitstream can be decoded with defined capability and resources.

SUMMARY OF THE INVENTION

In order to solve the above problem, a joint computational and memory requirement model is designed. By considering the computational as well as the memory requirements of the bitstreams we can accurately constraint the resource requirements in the decoder.

The memory requirements are well defined by the amount of memory available. The usage and release of the memory is also well defined in time by the decoding and presentation time stamps of the video sequence. This time stamps are embedded in the bitstreams.

By linking the computation complexity units to the memory usage, it is therefore possible to solve the first problem where the window for defining the complexity bound is ambiguous. By linking these requirements, the computational and memory requirements can be bounded based on the decoding and presentation time stamps. There is no longer the need for defining a sliding window for measurement of complexity. At the same time the pictures are not constrained to have constant complexity.

Furthermore, the VCV model 130 provides the computational requirements to determine the start and end time of the decoding of the macroblocks. The VMV 140 model describes the behavior of the reference memory and the occupancy of the reference memory. The VPV 105 defines an algorithm to check the bitstream and verify the amount of presentation buffer.

This invention links the models in terms of the memory consumption, which allows the bitstreams to be constrained by a physical limitation of the decoder. The apparatus to implement the verification is also provided in this invention.

Furthermore, a complete new set of verifier models is developed: Video Complexity Verifier (VCV), Video memory Verifier (VMV) and Video Presentation Verifier (VPV). The models specify the behavior of a decoder for variable VOP size and rate and define new parameters and bounds to measure and verify the computational and memory resources that the bitstream demands, see.

The operation of the invention is as follows. The encoder monitors the complexity of the bitstream being generated by counting the macroblock type. Each macroblock type is assigned a predefined cost in some complexity units. Each macroblock decoded also consumes a predefined amount of memory space. Depending on the type of the VOP the memory is occupied for different duration. Memory is released when the macroblock in the VOP is no longer required for display or prediction.

The virtual decoder is assigned the maximum bound of complexity units and memory. The virtual decoder is allowed to decode the bitstream as fast as is possible subject to the limit of the complexity bound. However, in doing so the decoder would have to have extra memory to keep the decoded VOPs until it is time for them to be displayed or until it is no longer needed for prediction. So it is clear that the virtual decoder is bounded both by the amount of processing capability and memory available.

Therefore by monitoring the complexity units requirements of the bitstream and adjusting the decoding time stamp of the VOP the virtual decoder is able to prevent the memory usage from exceeding its bound. Thus the virtual decoder is allowed to use less time on a simple VOP and more time on a complex VOP. The virtual decoder is defined by the following rules:

a) The amount of memory required for decoding the current VOP is defined by the number of macroblocks in the VOP and is consumed at a constant rate between the decoding time stamp of the current VOP and the next VOP.

b) At the presentation time of an I- or P-VOP the total memory allocated to the previous I- or P-VOP in decoding order is released instantaneously.

c) At the presentation time of a B-VOP the total memory allocated to that B-VOP is released instantaneously.

d) At any time, the decoding time stamp of the $(n+1)^{th}$ VOP in decoding order, $DTS_{n+1}$, must be less than or equal to the presentation time stamp of the $n^{th}$ VOP in decoding order, $PTS_n$.

$$DTS_{n+1} \leq PTS_n \quad (1)$$

where n is in decoding order.

e) At any time, the sum of the memory consumed must not exceed the maximum memory resources available, $M_{Max}$. Otherwise, the virtual decoder is said to have memory overflow.

f) At any time, the ratio of the decoding complexity of the current VOP, $C_n$, to the decoding time available, $DTS_{n+1} - DTS_n$, must be less than the maximum complexity resources available per second, $C'_{Max}$. Otherwise, the virtual decoder is said to have complexity overflow.

$$C_n/(DTS_{n+1} - DTS_n) < C'_{Max} \quad (2)$$

where n is in decoding order.

A valid bitsteam is thus one where the values in the bitstream satisfy the conditions in d), e) and f) and does not cause the vertual decoder to overflow in memory or complexity resources.

DESCRIPTION OF THE PREFERRED EMBODIMENTS

First Embodiment

Figure 1:
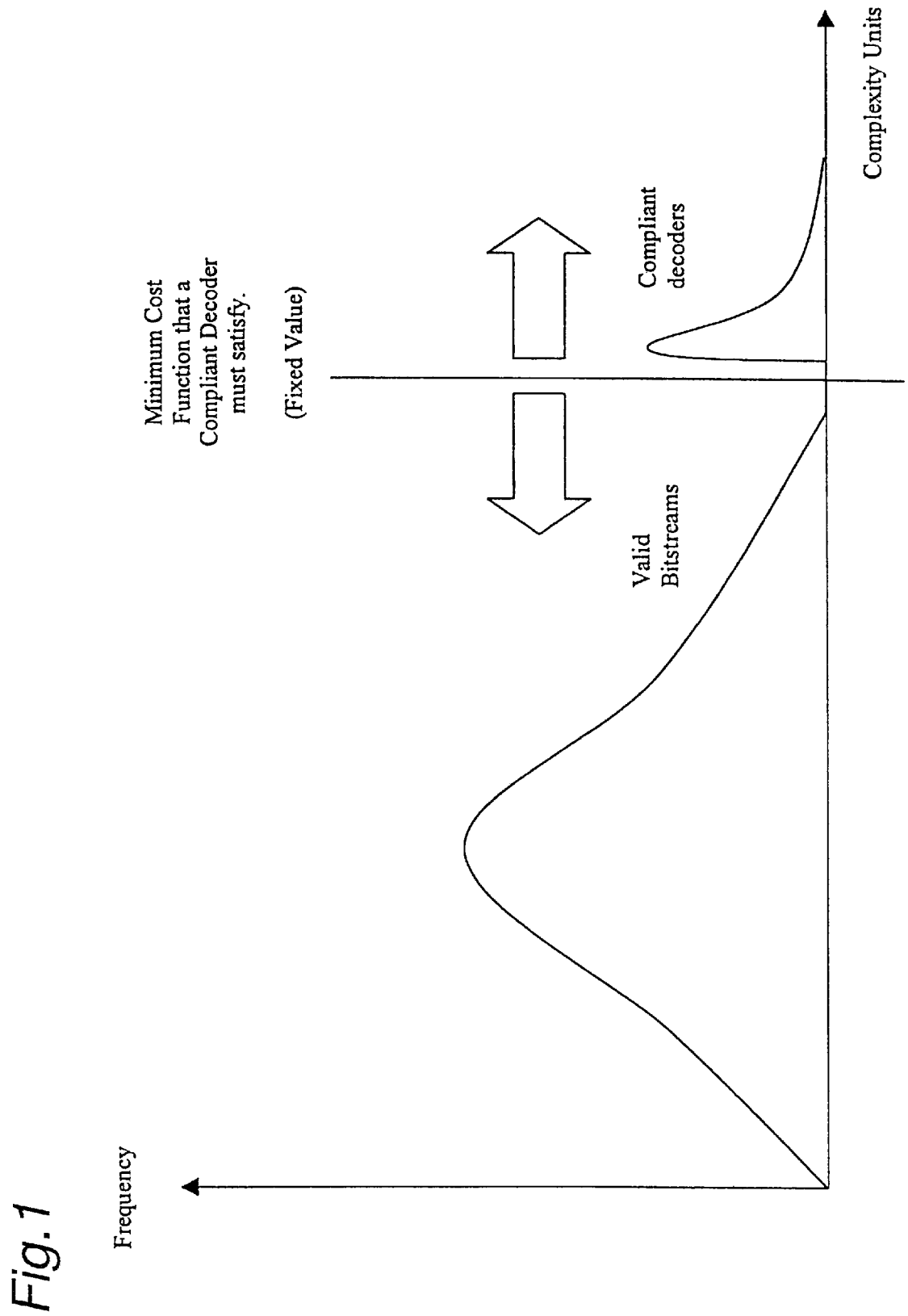
FIG. 1 is a distribution of bitstream complexity and decoder resources in complexity units of prior art.
Figure 2:
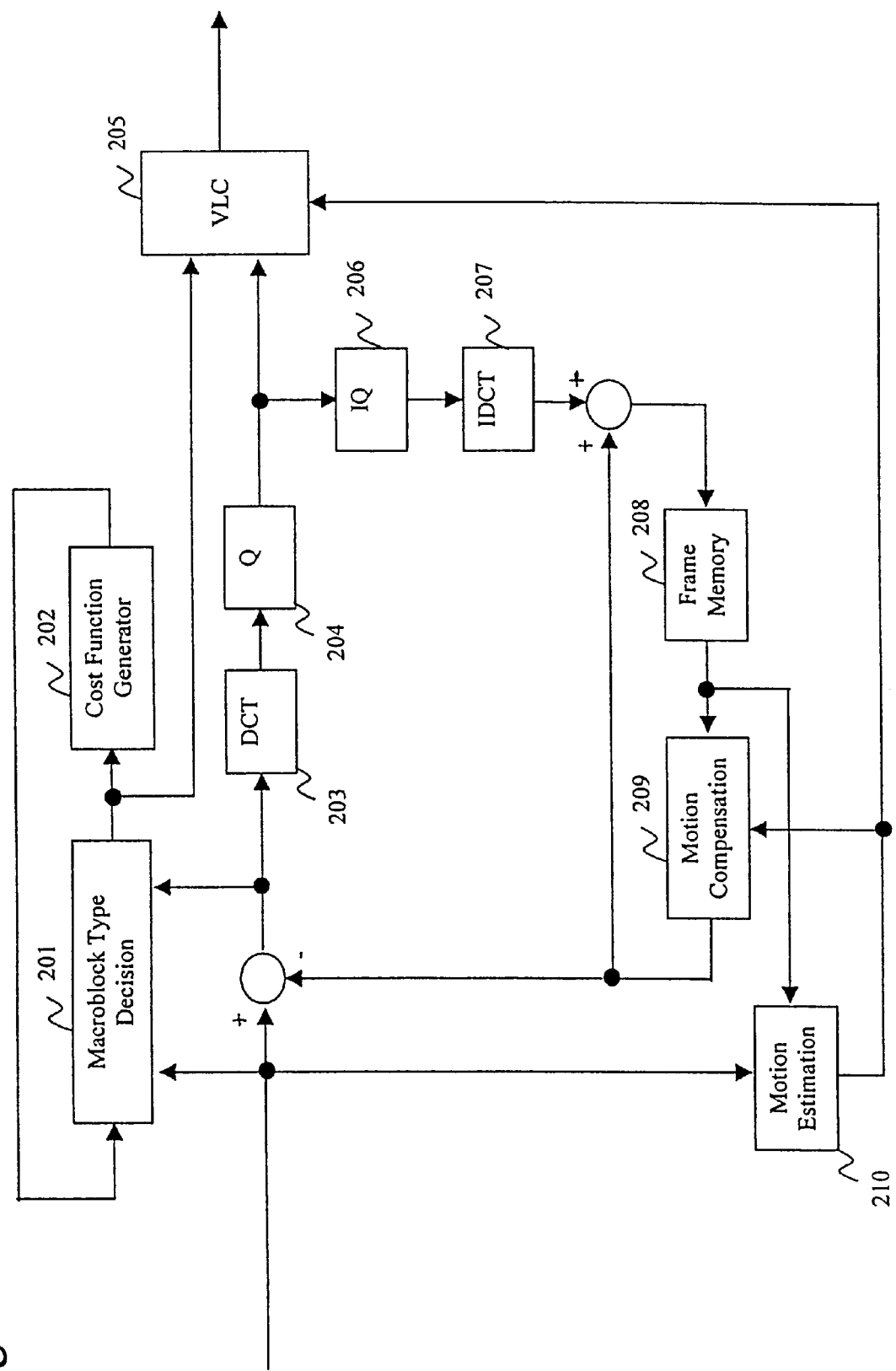
FIG. 2 is a complexity measure and control in video encoder of prior art.
Figure 3:
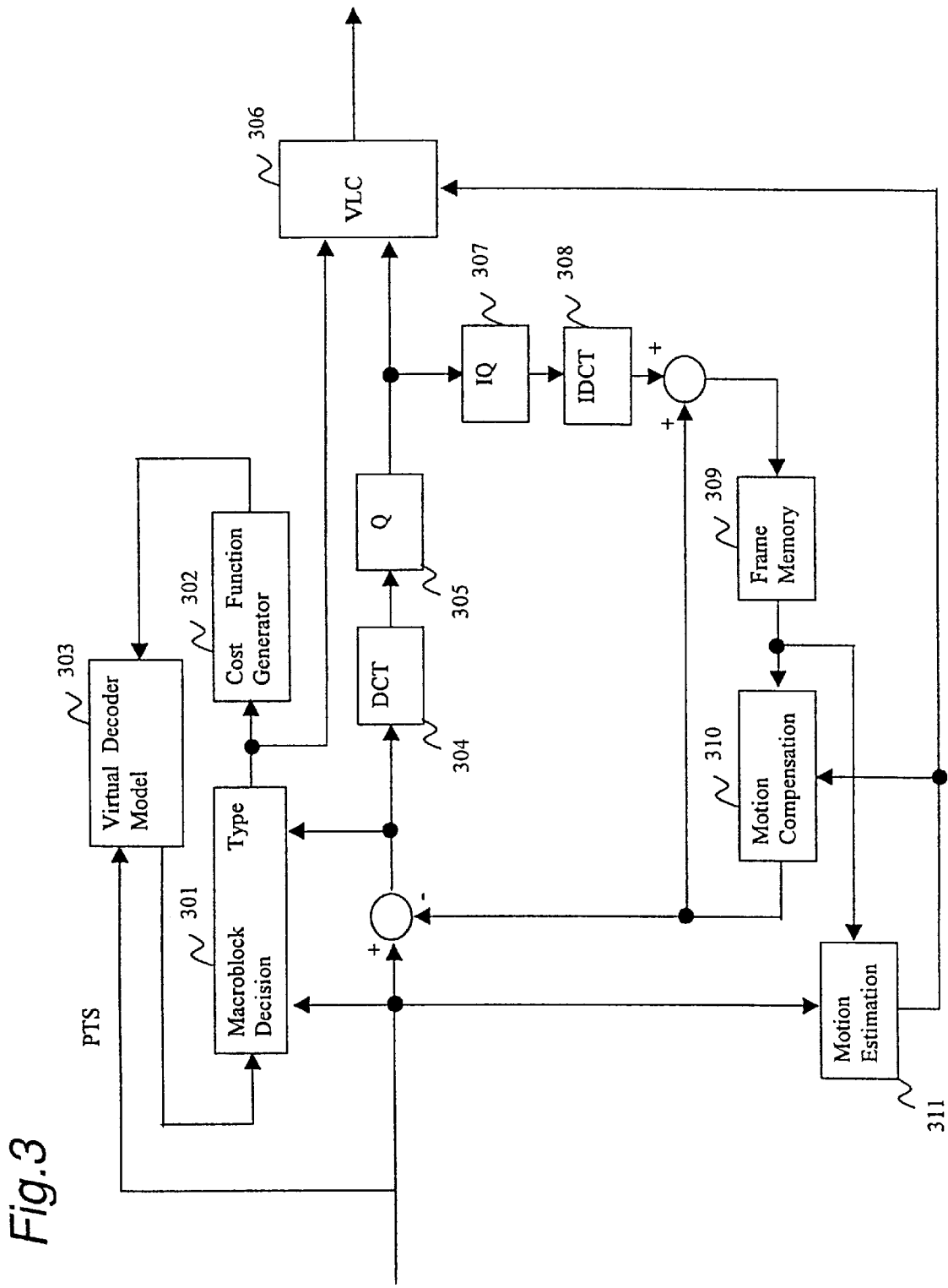
FIG. 3 is a complexity measure and control with vertual decoder in video encoder according to the first embodiment.

The first embodiment is shown in FIGS. 3, 4, 5 and 6. FIG. 3 shows the same diagram as in the prior art of FIG. 2, but with new portions added according to the present invention. The first embodiment uses a vertual decoder 303. The output of the cost function generator 302 is not directly fed back to the macroblock type decision module 301, but via the vertual decoder 303. The vertual decoder 303 also receives the presentation time stamps of the pictures being coded. The vertual decoder 303 performs the function as described above. It is a hypothetical model that simulates a decoder that has a bounded computational and memory resources. These resources are consumed according to the encoding information found in the cost function generator and the presentation time stamps.

Figure 4:
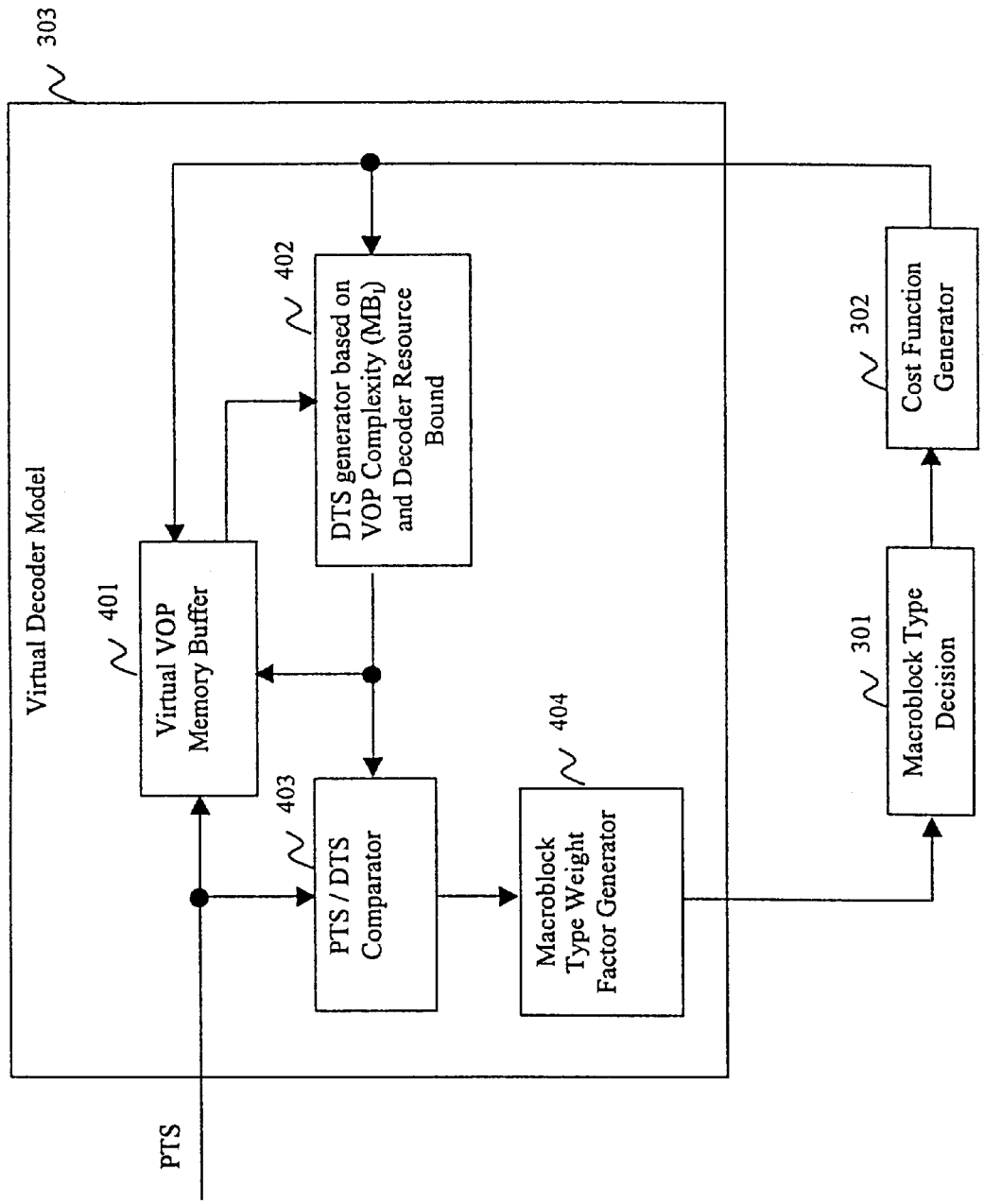
FIG. 4 is a block diagram for the vertual decoder of the first embodiment.

FIG. 4 illustrates the functions of the vertual decoder 303. The complexity cost function from the cost function generator 302 is passed to the Virtual VOP memory buffer 401, and the decoding time stamp (DTS) generator 402. The virtual VOP memory buffer 401 also receives the presentation time stamp (PTS) and the decoding time stamp (DTS) signals. It then simulates the memory buffer usage. The output of the virtual VOP memory buffer 401 is the memory buffer occupancy. This information is passed to the DTS generator 402 to enable it to generate the next DTS.

The generation of the DTS is dependent on the memory buffer occupancy and the complexity cost function. As the memory is being filled up, the next DTS may be delayed to allow more time for decoding the current picture and thus fill the memory buffer later. Similarly, as the complexity cost function of the current picture goes up, the DTS of the next picture can also be delayed to allow the decoder more time to decode the current picture. A possible function is given below:

$$DTS_{n+1} = DTS_n + c_1 \times buffer_{13} \text{ fullness} + c_2 \times complexity\_cost \quad (3)$$

where $c_1$ and $c_2$ are constant factors that are determined by the frame rate of the sequence.

The DTS cannot be too quick, as if two consecutive DTS are too close the denominator in equation (2) will become small and the left-hand side of the equation would exceed the limits of the right-hand side. When this happen the decoder has run out of computational resource. See rule f) explained above.

Similarly, the DTS cannot be delayed indefinitely, since the picture will have to be displayed at a particular time given by the PTS. See rule d) above. This check is done in the PTS/DTS comparator 403, where difference between the PTS and DTS is checked. The result is passed to the macroblock type weight factor generator 404, where the weighting factor for each macroblock type is generated. These weights are used to regulate the decision made in the macroblock type decision module 301.

Figure 5:
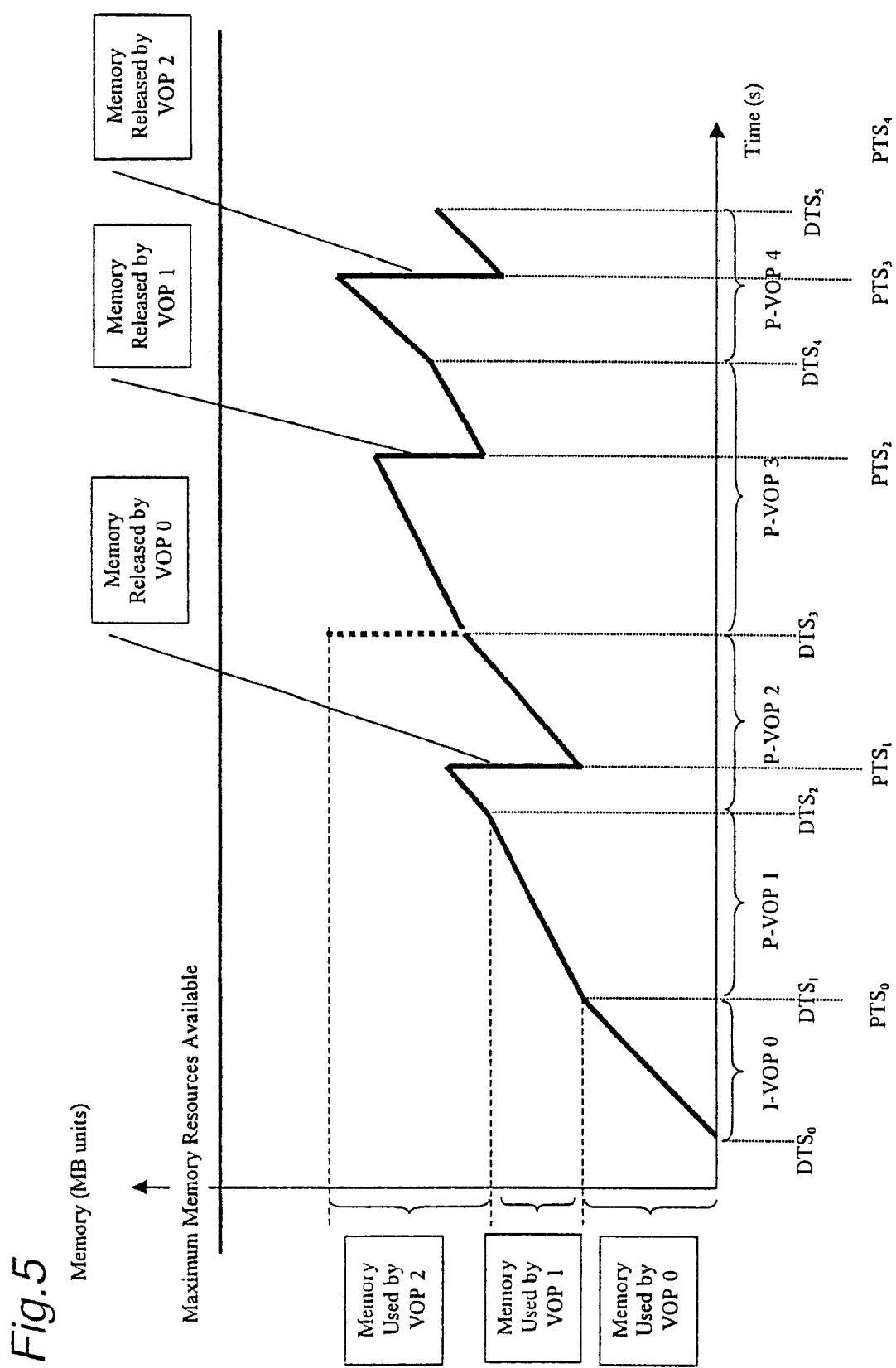
FIG. 5 is a graph showing the functionality of the vertual decoder with the decoding and presentation time stamps without frame reordering.
Figure 6:
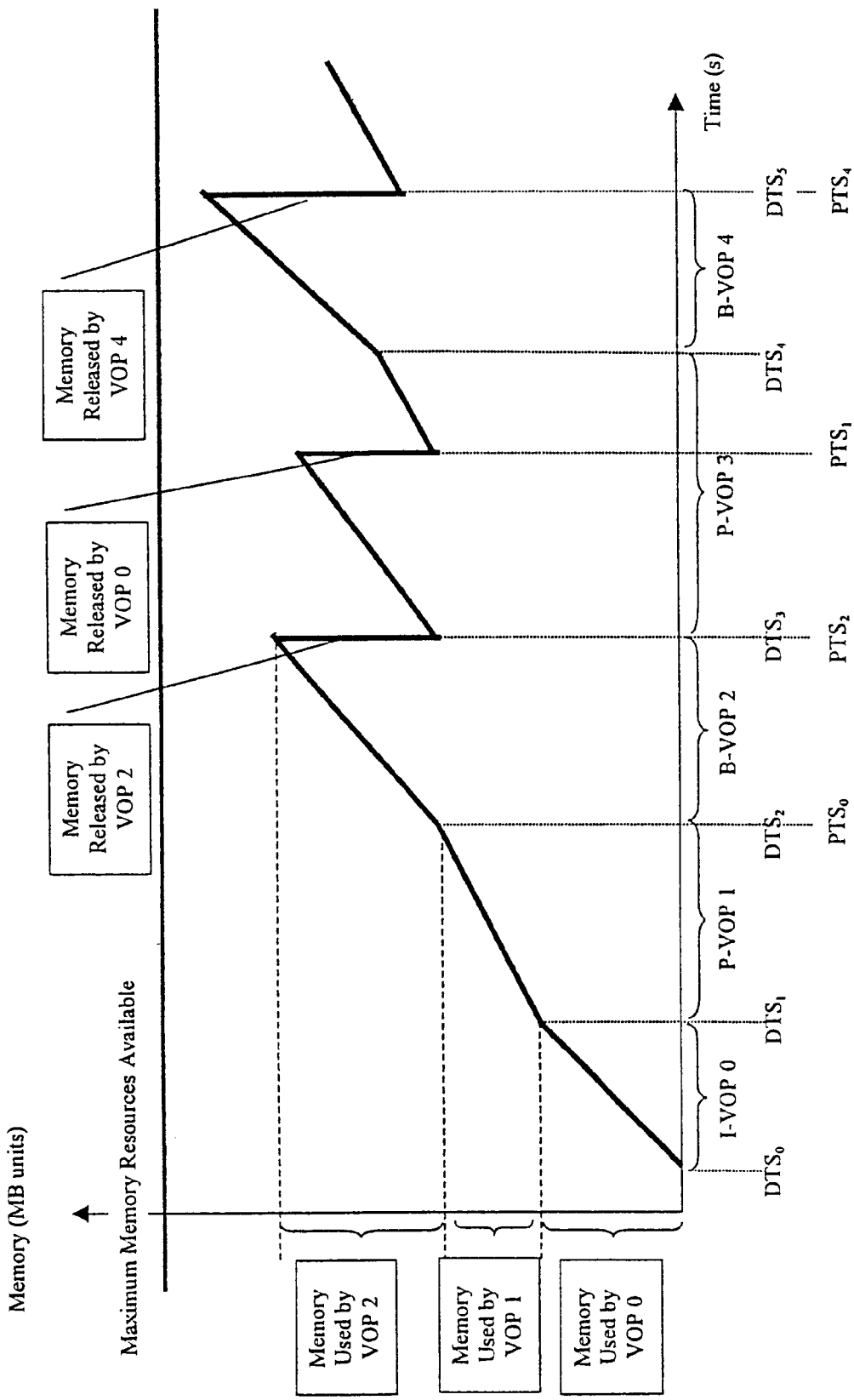
FIG. 6 is a graph showing the functionality of the vertual decoder with the decoding and presentation time stamps, and particularly showing an example of the embodiment of the vertual decoder.

The Virtual VOP Memory Buffer implements rules a) to c) and ensures that rule e) is not violated. There are two examples of this embodiment which are shown in FIGS. 5 and 6. FIG. 5 shows the case where the VOP coding type consists of I and P-VOPs only. Therefore the VOPS are decoded and displayed in the same order. FIG. 6 shows the case where the VOP coding types consists of I, P and B-VOPs. Due to the bidirectional prediction of the B-VOPs, there is a need to reorder the VOPS for encoding such that the coding order and the display order of the VOPs are different. Therefore, in the model the VOPs are decoded and displayed in different order.

Case1: I and P-VOPs Only

The following describes the operation virtual VOP memory buffer when there are only I and P-VOPs. The horizontal axis shows the time and the corresponding time stamps when an event starts. The vertical axis shows the memory usage. The limit of the memory resources is marked by the maximum memory resource available.

According to rule a), at time $DTS_0$ the virtual decoder starts decoding the first VOP, I-VOP 0. It completes the decoding at $DTS_1$. The virtual decoder, or model, assumes that the memory used by VOP 0 is linear in time, thus the straight line shown between $DTS_0$ and $DTS_1$. Between $DTS_1$ and $DTS_2$ the decoded decodes the P-VOP 1 and consumes VOP 1 worth of memory. This process is repeated for all intervals of $DTS_i$ to $DTS_{i+1}$ and is shown in FIG. 5 as the linearly increasing lines.

Rule b) is shown at each PTS except at $PTS_0$ where it does not have a previous VOP. At $PTS_1$, the memory that is consumed by VOP 0 is released instantaneously. This is shown as the vertical line on the graph. Similar vertical drop in the memory consumed is shown at time $PTS_i$ through out the graph.

As long as the graph stays between the limits of the maximum memory resources available and that, the DTS and PTS satisfy the conditions of rule e), then the model is operation within its limits. The model has overflowed when one or more of rule d), e) or f) is violated.

Case2: I, P and B-VOPs

FIG. 6 shows the case where there are I, P and B-VOPs. When there are B-VOPs in the sequence then there is a need for reordering the decoding order. In this example the encoded sequence contains VOPs 0, 1, 2, 3, 4, . . . VOP 0 is and I-VOP, VOPs 1 and 3 are P-VOPs and VOPs 2 and 4 are B-VOPS. The actual display order of these VOPs is 0, 2, 1, 4, 3, . . . Notice the reorder of VOPs 1 and 2 as well as 3 and 4. This is because the B-VOP 2 needs the P-VOP 1 for prediction therefore the P-VOp is decoded first although its display order comes after the B-VOP 2.

According to rule a), at time $DTS_0$ the Virtual Decoder starts decoding the first VOP, I-VOP 0. It completes the decoding at $DTS_1$. The model assumes that the memory used by VOP 0 is linear in time, thus the straight line shown between $DTS_0$ and $DTS_1$. Between $DTS_1$ and $DTS_2$ the decoded decodes the P-VOP 1 and consumes VOP 1 worth of memory. Between $DTS_2$ and $DTS_3$ the decoded decodes the B-VOP 2 and consumes VOP 2 worth of memory.

Rules b) and c) are applied at each PTS except at $PTS_0$ where it does not have a previous VOP. At $PTS_2$, the memory that is consumed by VOP 2 is released instantaneously. This is shown as the vertical line on the graph. Similar vertical drop in the memory consumed is shown at time $PTS_i$ through out the graph.

As long as the graph stays between the limits of the maximum memory resources available and that, the DTS and PTS satisfy the conditions of rule e), then the model is operation within its limits. The model has overflowed when one or more of rule d), e) or f) is violated.

Virtual Complexity Verification

In a separate embodiment, the vertual decoder 303 is used not for controlling the complexity of the encoded bitstream but for verifying that the bitstream conforms to the complexity specification. There are two methods of verification. One is done internally in the encoder while the bitstream is being generated and the other external of the encoder after the bitstream has been generated. These are shown in FIGS. 7 and 8, respectively.

Figure 7:
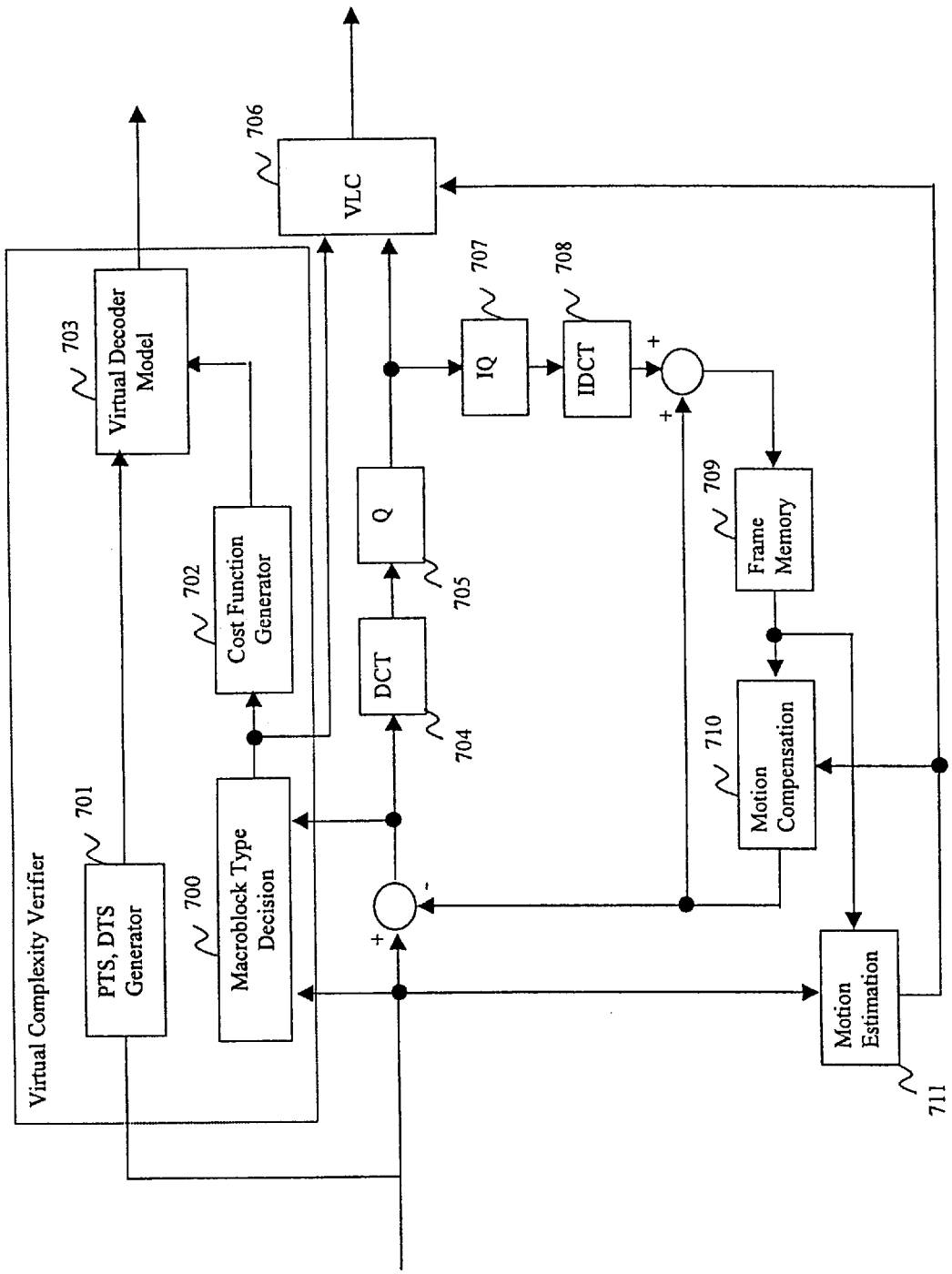
FIG. 7 is a block diagram showing a complexity measure and verification with hypothetical virtual complexity verifier in video encoder according to the present invention.

In FIG. 7, the hypothetical virtual complexity verifier calculates the cost function through the cost function generator 702, as well as receives the PTS and DTS from the PTS, DTS generator 701. This information is then applied through the vertual decoder 703, as described above. The verifier ensures that the rules a) to f) are satisfied for the bitstream to be valid.

Figure 8:
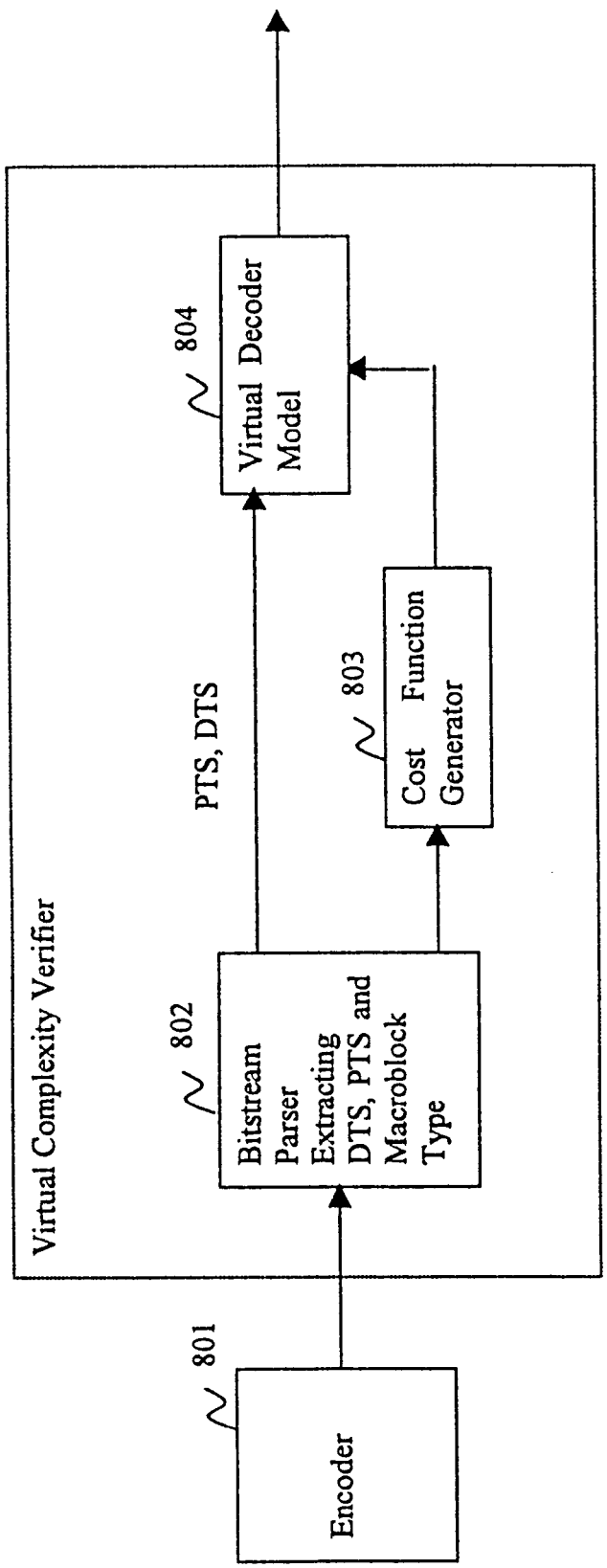
FIG. 8 is a block diagram showing a complexity measure and verification using hypothetical virtual complexity verifier

FIG. 8 shows the case where the hypothetical virtual complexity verifier is attached to the output of the encoder 801. The Parser 802, parses the bitstream from the output of the encoder to obtain the PTS, DTS and macroblock encoding type. The macroblock encoding type is then passed to the cost function generator 803, where the cost function is evaluated. The cost function together with the PTS and DTS is applied through the vertual decoder 804, as described in the previous section. The verifier ensures that the rules a) to f) are satisfied for the bitstream to be valid.

With the first embodiment, the encoder is capable of controlling and regulating the complexity of the coded bitstreams that it generates. At the same time, the decoder is ensured that streams that are too complex will not be created. The effect of this invention is that the design of the decoders no longer have to be based on the worse case scenario but based on the common complexity measure that is specified by the standard. The cost of these products can therefore be reduced, as there is no need for over engineering.

Second Embodiment

The second embodiment describes the general operation of the present embodiment.

A model is a simulation of the actions of a target decoder and its modules such as the bitstream buffer, the central processing unit (CPU), or the memory storage device. A model may be used as and embedded video verifier in the encoder during the creation of the encoded bitstream in order to ensure that a typical decoder can decode the bitsteam that the encoder creates. A model may also be used as a stand-alone video verifier. A stand-alone video verifier is used to check and verify a bitstream that have already been encoded by some means to ensure that a typical decoder is able to decode it.

Figure 9:
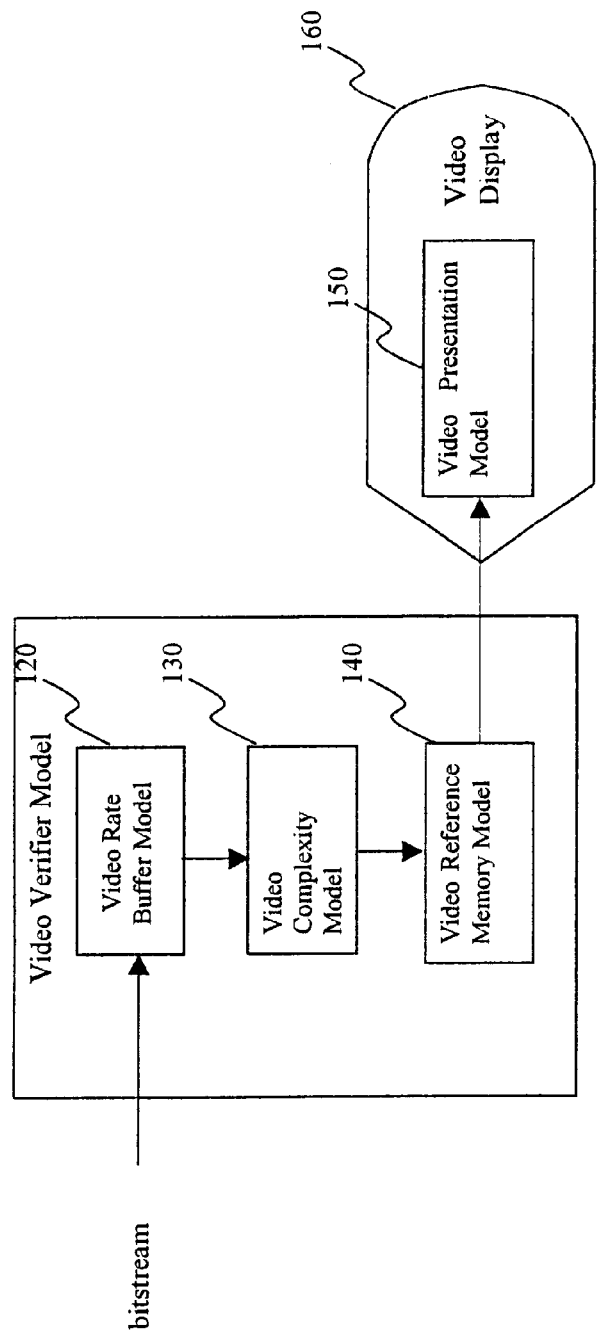
FIG. 9 is a block diagram of a video verifier model, particularly showing the interrelationship between the VBV, VCV, VMV and the VPV.

This embodiment presents a video verifier, shown in FIG. 9, which comprises the following models:

1) A video buffer model 120,
2) A video complexity model 130,
3) A video reference memory model 140, and
4) A video presentation model, 150.

Each of the models is shown individually in FIGS. 10, 12, 14, and 16, respectively.

Figure 10:
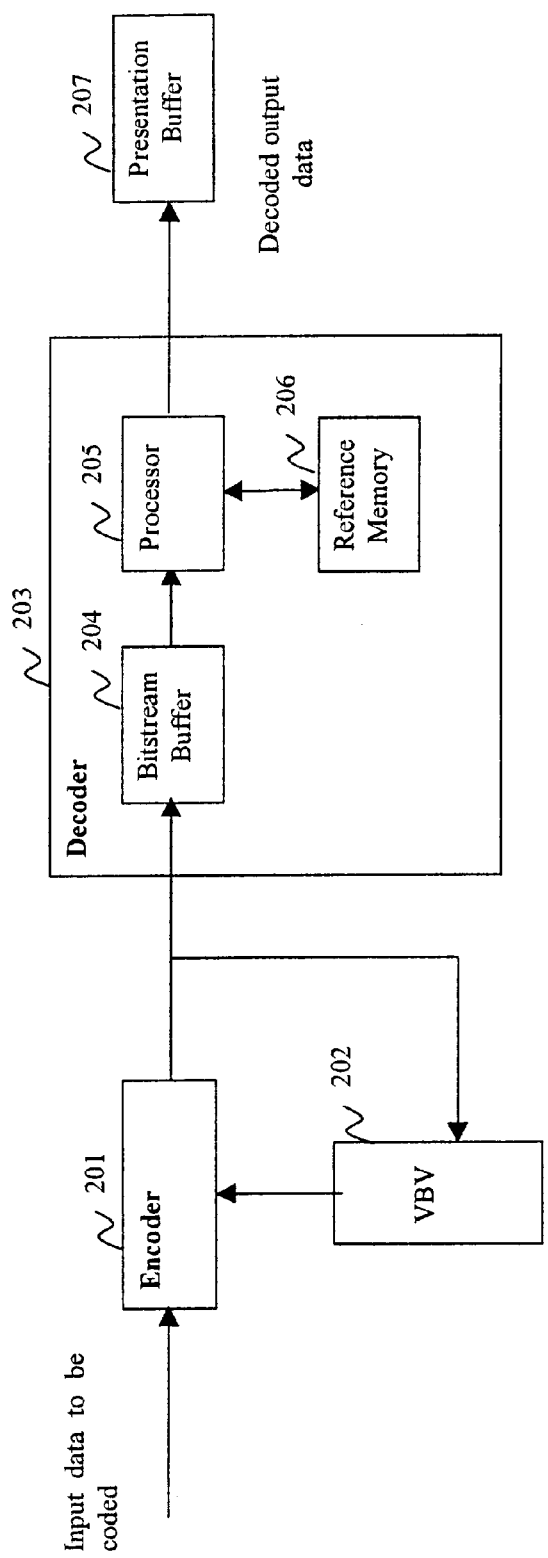
FIG. 10 is a block diagram of a video buffer verifier, particularly showing the layout of the video buffer verifier connected to the output of the encoder.

FIG. 10 shows a video buffer model 120, which is has a video buffer verifier 202. Video buffer verifier 202 is required in order to bound the memory requirements for the bitstream buffer needed by a video decoder, with which, the video encoder can be constrained to make bitstreams which are decodable with a predetermined buffer memory size. The video buffer verifier 202 attached to the output of the encoder 201 is used to simulate the bitstream buffer 204 present in an actual decoder 203.

Figure 11:
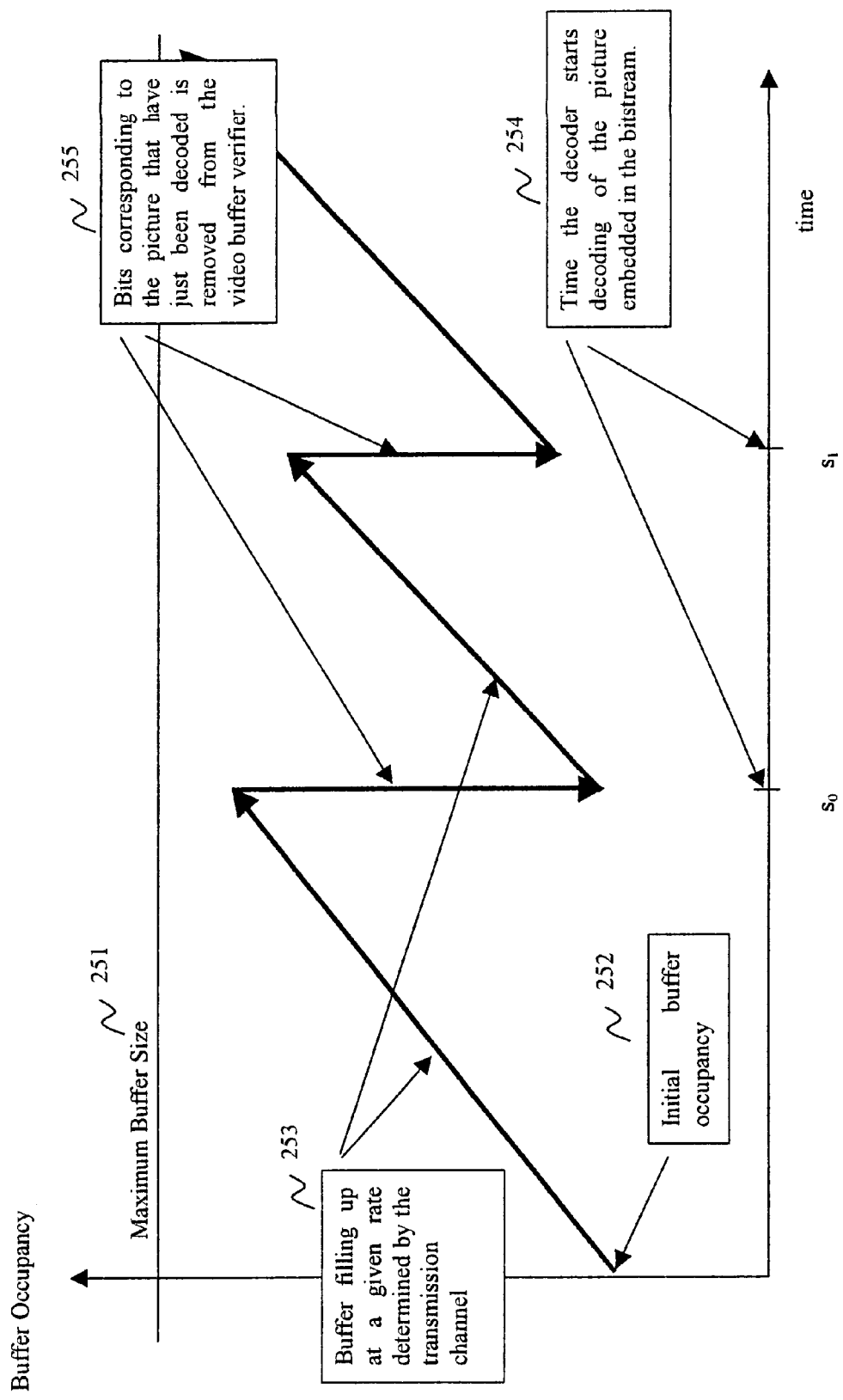
FIG. 11 is a graph showing an operation of a video buffer verifier occupying time.

The video buffer verifier 202 works in the following way as illustrated by the graph in FIG. 11. It simulates the bitstream buffer of the decoder by making the following assumptions. First it assumes a certain maximum buffer size 251 and initial occupancy 252 of the virtual buffer verifier. Next it is assumed that the virtual buffer verifier is filled 253 with bits from the bitstream that is produced by the encoder. It is assumed that the virtual buffer verifier is filled at a specific rate that is governed by the channel that is used to transport the bitstream. Then by interpreting the timing information embedded in the bitstream, the video buffer verifier works out the time at which the decoder is expected to start the decoding of the individual pictures of the input data coded in the bitstream 254. At the time at which the decoder is suppose to complete the decoding of the individual pictures of the input data the number of bits representing the current picture are removed from the virtual buffer verifier 255. It is assumed that the bits are removed instantaneously from the buffer.

The virtual buffer verifier 202 content is checked at the instant before and after the bits are removed from it. If the occupancy virtual buffer verifier exceed the maximum buffer size then the virtual buffer verifier is said to have overflowed. If the bits to be removed are more that what is available in the virtual buffer verifier then the virtual buffer verifier is said to have underflowed. For normal operation the buffer is not allowed to overflow. In the case of underflow the decoder is assumed to idle until the required bits arrive at the virtual buffer verifier.

By implementing this model and using it to regulate and check the bitstreams that are created by the encoder, we can be sure that any decoder that is compliant to the specifications of the standard can decode the bitstreams so generated. The bitstream will not overflow or underflow the bitstream buffer of the decoder.

Figure 12:
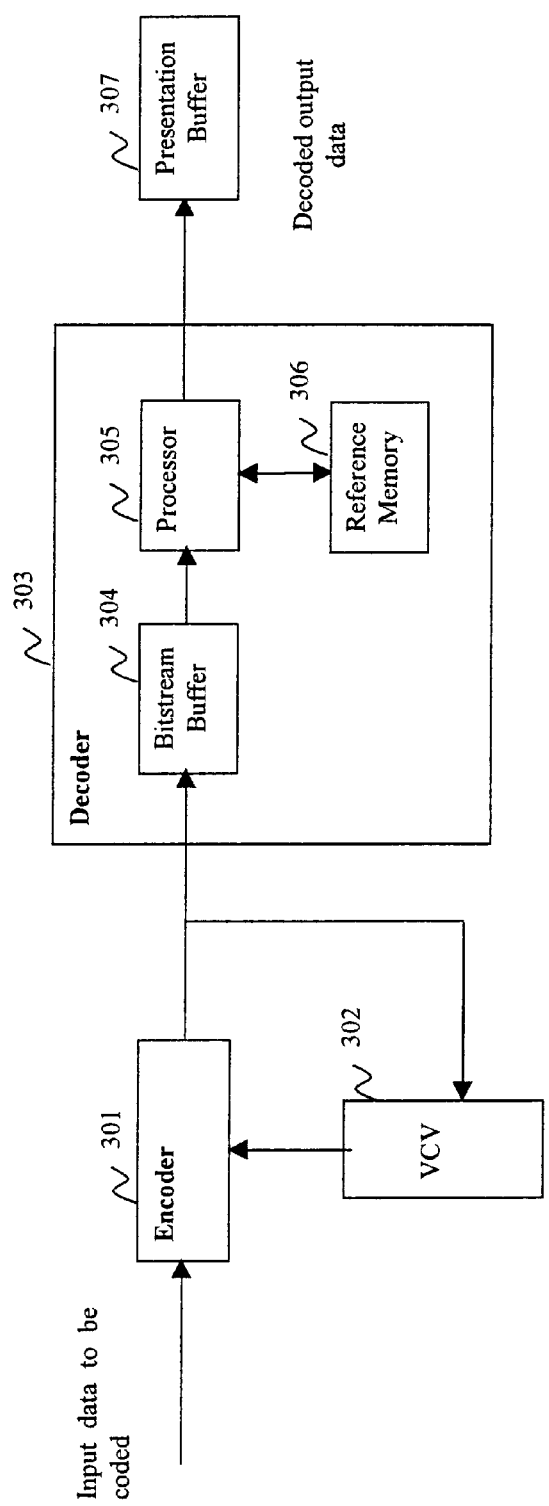
FIG. 12 is a block diagram of a video complexity verifier, particularly showing the layout of the video complexity verifier connected to the output of the encoder.

FIG. 12 shows a video complexity model 130, which has a video complexity verifier 302. The video complexity verifier 302 is required in order to bound the processing speed requirements needed by a video decoder, with which, the video encoder can be constrained to make bitstreams which are decodable with a predetermined decoder processor capability. The video complexity verifier 302 attached to the output of the encoder 301 is used to simulate the processor 305 present in an actual decoder 303.

Figure 13:
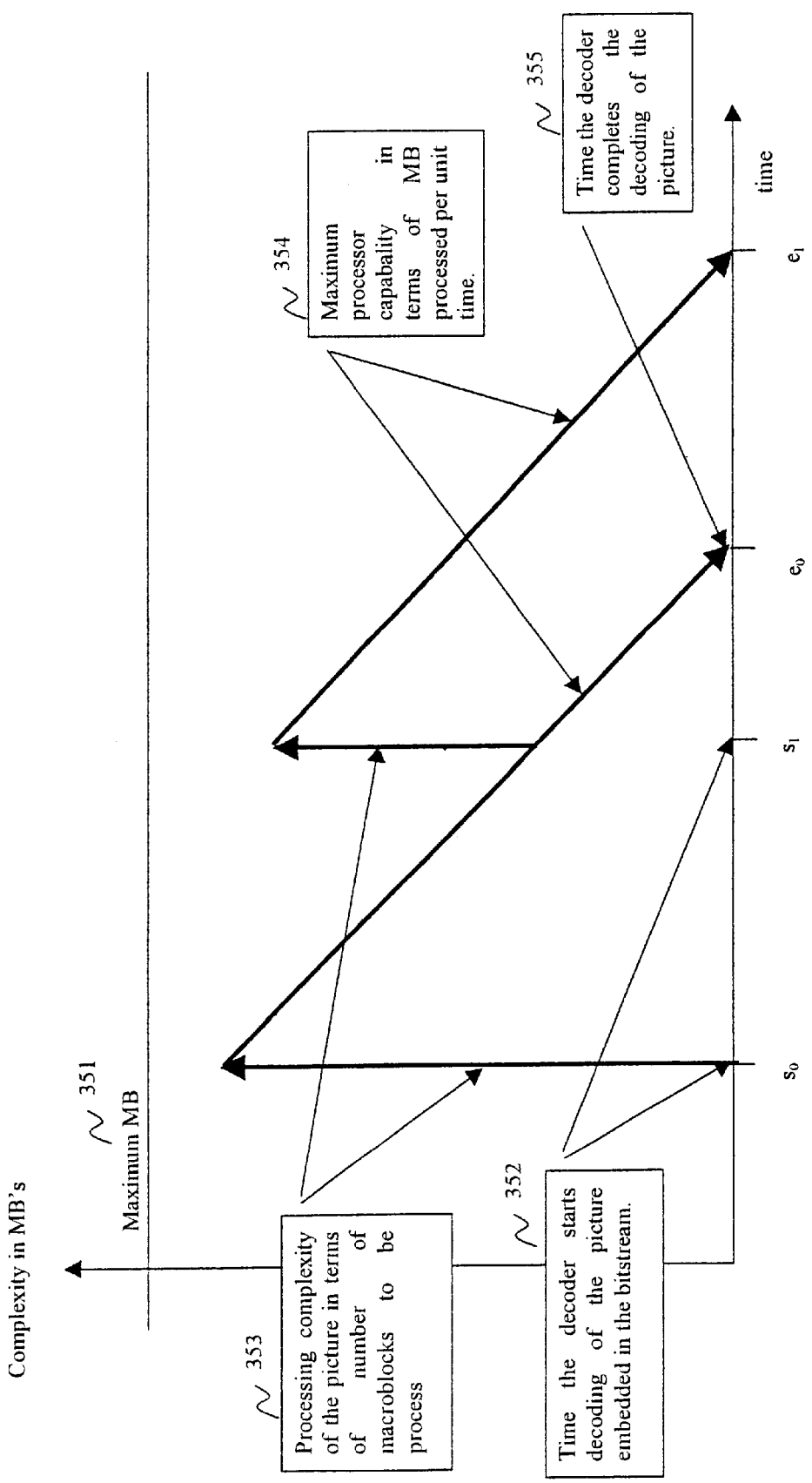
FIG. 13 is a graph showing an operation of the video complexity verifier occupying time.

The video complexity verifier 302 works in the following way as illustrated by the graph in FIG. 13. It simulates the processor of the decoder by making the following assumptions. The picture is segmented into smaller processing units called macroblocks. First it assumes that there is a certain maximum number of macroblocks 351 that the processor can accumulate in its buffer for processing. This puts a bound on the amount of delay the processor is allowed to have before the picture has to be decoded. Next the video complexity verifier determines the start of the decoding time by inspecting the information encoded in the bitstream. At the time the decoder is expected to start the decoding of the individual pictures of the input data coded in the bitstream 352, the virtual complexity verifier determines the complexity of the picture to be decoded in terms of number of macroblocks 353. This number of macroblocks is then placed in the video complexity verifier queue for processing. The video verifier then processes the macroblocks at a given maximum rate of macroblocks per unit time 354. This maximum rate is based on the specification of the standard. Using these assumptions the time of the completion of the decoding of the pictures is calculated 535. A simple formula of dividing the size of the queue by the processing rate will give the time it takes to complete the decoding of the picture just submitted into the queue.

The video complexity verifier queue is checked at the start time of the decoding to ensure that the queue does not exceed the maximum number of macroblocks limit. This is to ensure that all the pictures can be decoded within certain decoder latency.

In a different variation of the video complexity verifier, the complexity of the bitstream is further measured in terms of the different types of macroblocks. The coding types of the macroblocks are used to classify the macroblocks into different categories of complexity. The complexity is then normalised with respect to the simplest type of macroblock, which is given a unit of one macroblock complexity. The remainder categories are given a weight of w times one macroblock complexity where w varies for each of the categories depending on the complexity and is always a value greater than one. The weighted sum of the macroblock complexity is then used in the video complexity verifier.

By implementing this model and using it to regulate and check the bitstreams that are created by the encoder, we can be sure that any decoder that is compliant to the specifications of the standard can decode the bitstreams so generated. The bitstream will not be too complex for the processor in the decoder.

Figure 14:
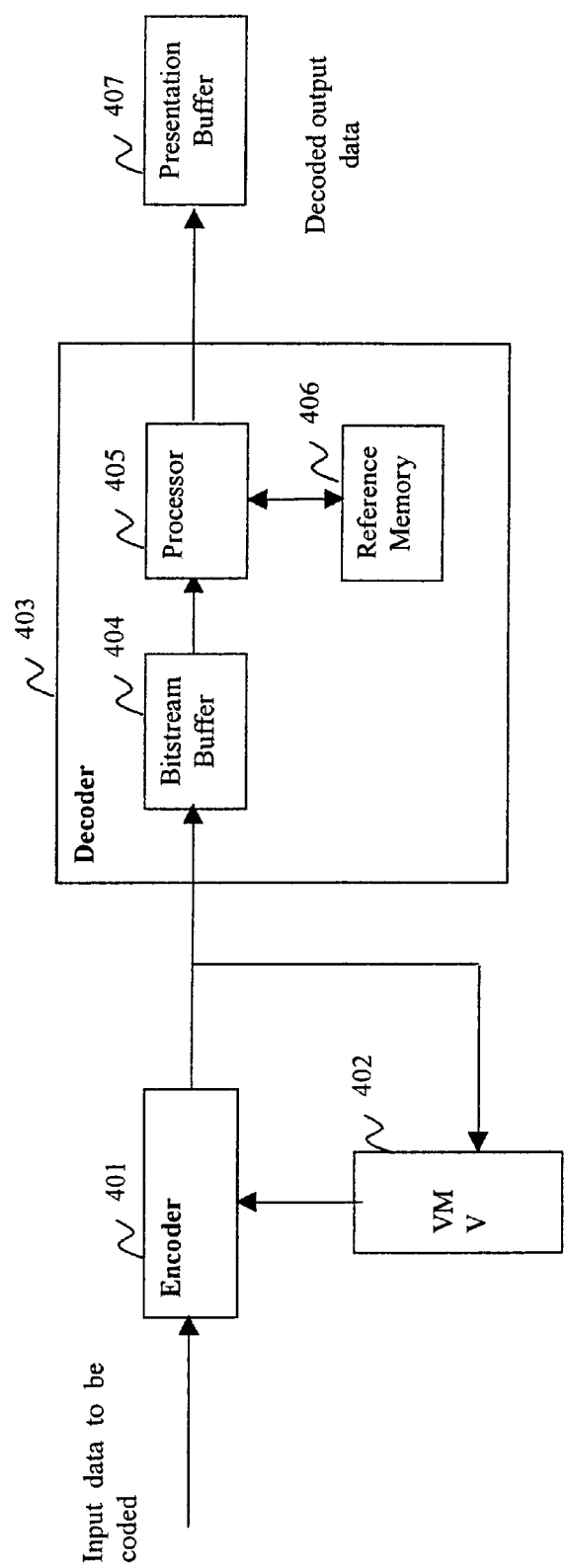
FIG. 14 is a block diagram of a video memory verifier, particularly showing the layout of the video memory verifier connected to the output of the encoder.

FIG. 14 shows a video memory model 140, which has a video memory verifier 402. The video memory verifier 402 is required in order to bound the reference memory requirements needed by a video decoder, with which, a video encoder can be constrained to make bitstreams which are decodable with a predetermined reference memory size. The video memory verifier 402 attached to the output of the encoder 401 is used to simulate the reference memory 406 present in an actual decoder 403.

Figure 15:
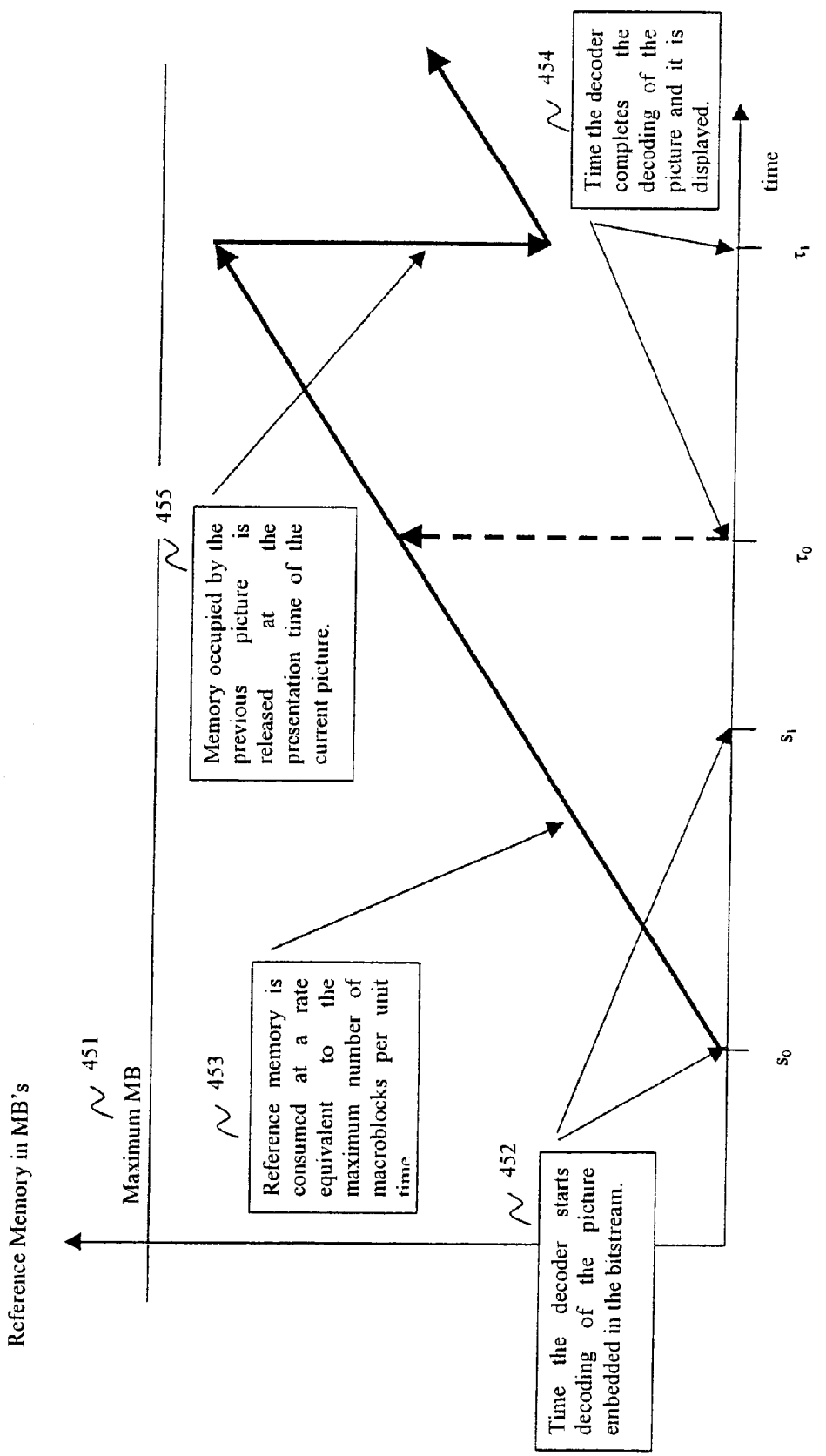
FIG. 15 is a graph showing an operation of the video memory verifier occupying time.

The video memory verifier 402 works in the following way as illustrated by the graph in FIG. 15. It simulates the memory consumption of the decoder by making the following assumptions. First it assumes a certain maximum reference memory in terms of macroblocks is available 451. During the decoding time 452, the reference memory is consumed at a constant rate given by the rate of decoding of the picture 453. The rate can be in terms of macroblocks per unit time. At the presentation time of the current picture 454 the memory occupied by the previous picture is instantaneously released 455.

The reason the memory occupied by the previous picture is released and not the current picture, is because the reference memory of the previous picture is used for the decoding of the current picture. It can be released only when it is no longer needed. The display time of the current picture is used to determine that the current picture has been decoded and therefore the previous picture is no longer needed and can be released. In the case of bidirectional prediction the release of the memory is more complicated. Since the bidirectional predicted pictures are not used for the prediction of future pictures, they are released from memory at their presentation time without any delay.

The video memory verifier is checked at the presentation time of each picture to see if it has exceeded the maximum reference memory. This is to ensure that there is always enough reference memory for the storage of the decoded picture.

By implementing this model and using it to regulate and check the bitstreams that are created by the encoder, we can be sure that any decoder that is compliant to the specifications of the standard can decode the bitstreams so generated. The bitstream will not occupy more reference memory than is available in the decoder.

Video Presentation Model

Figure 16:
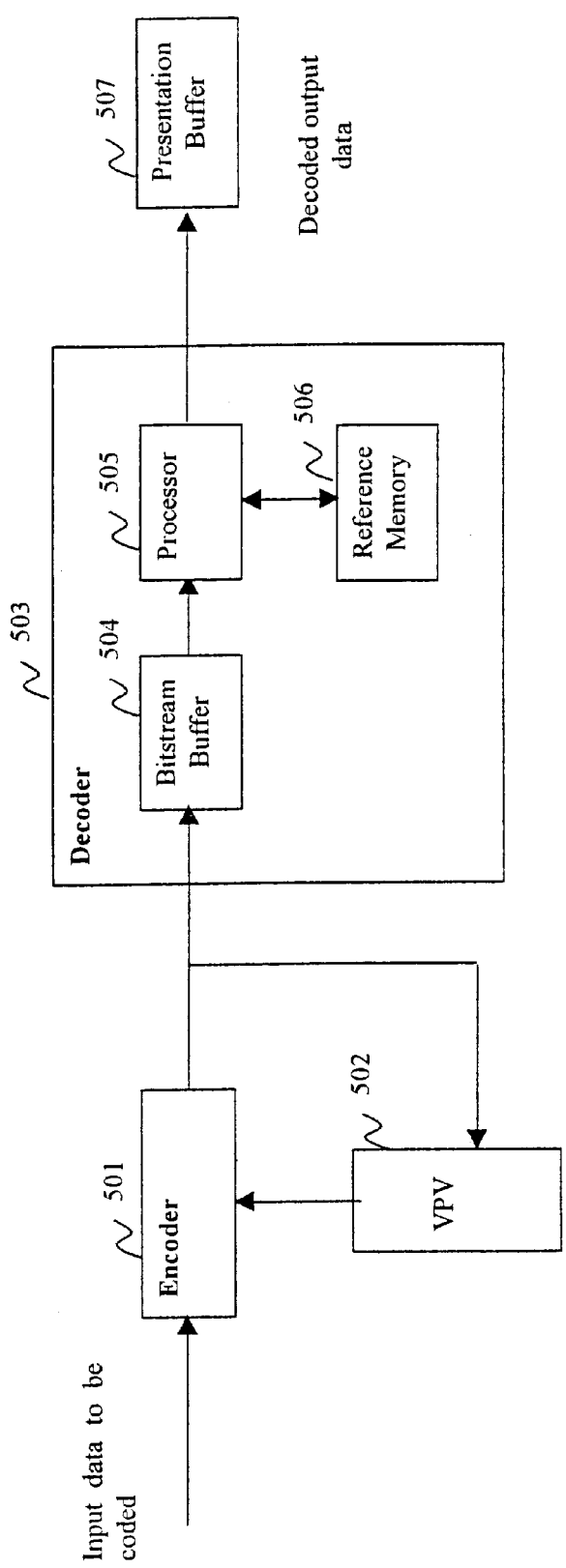
FIG. 16 is a block diagram of a video presentation verifier, particularly showing the layout of the video presentation verifier connected to the output of the encoder.

FIG. 16 shows a video presentation model 150, which has a video presentation verifier 502. The video presentation verifier 502 is required in order to bound the presentation memory requirements needed by a video display, with which, a video encoder can be constrained to make bitstreams which are displayable with a predetermined display memory size. The video presentation verifier 502 attached to the output of the encoder 501 is used to simulate the presentation memory 507 attached to the output of the actual decoder 503.

Figure 17:
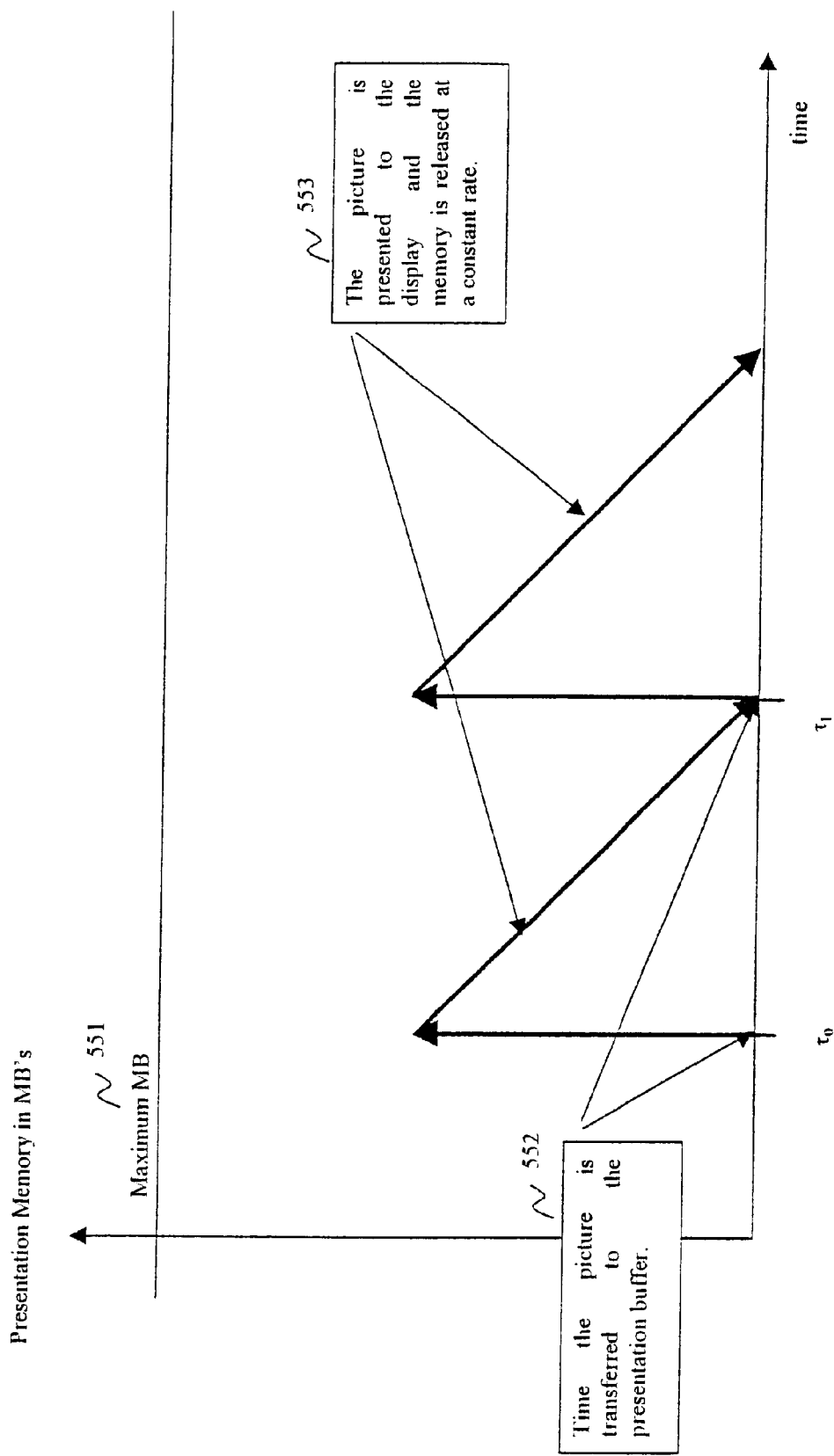
FIG. 17 is a graph showing an operation of the video presentation verifier occupying time.

The video presentation verifier 502 works in the following way as illustrated by the graph in FIG. 17. It simulates the presentation memory buffer of the display by making the following assumptions. First it assumes a certain maximum presentation memory in terms of macroblocks is available 551. During the presentation time 552, the presentation memory is filled with the complete decoded picture. This memory is then release at a constant rate as the picture is displayed 553. The presentation verifier is checked to ensure that the accumulated macroblocks in the buffer does not exceed the maximum available memory.

Figure 18:
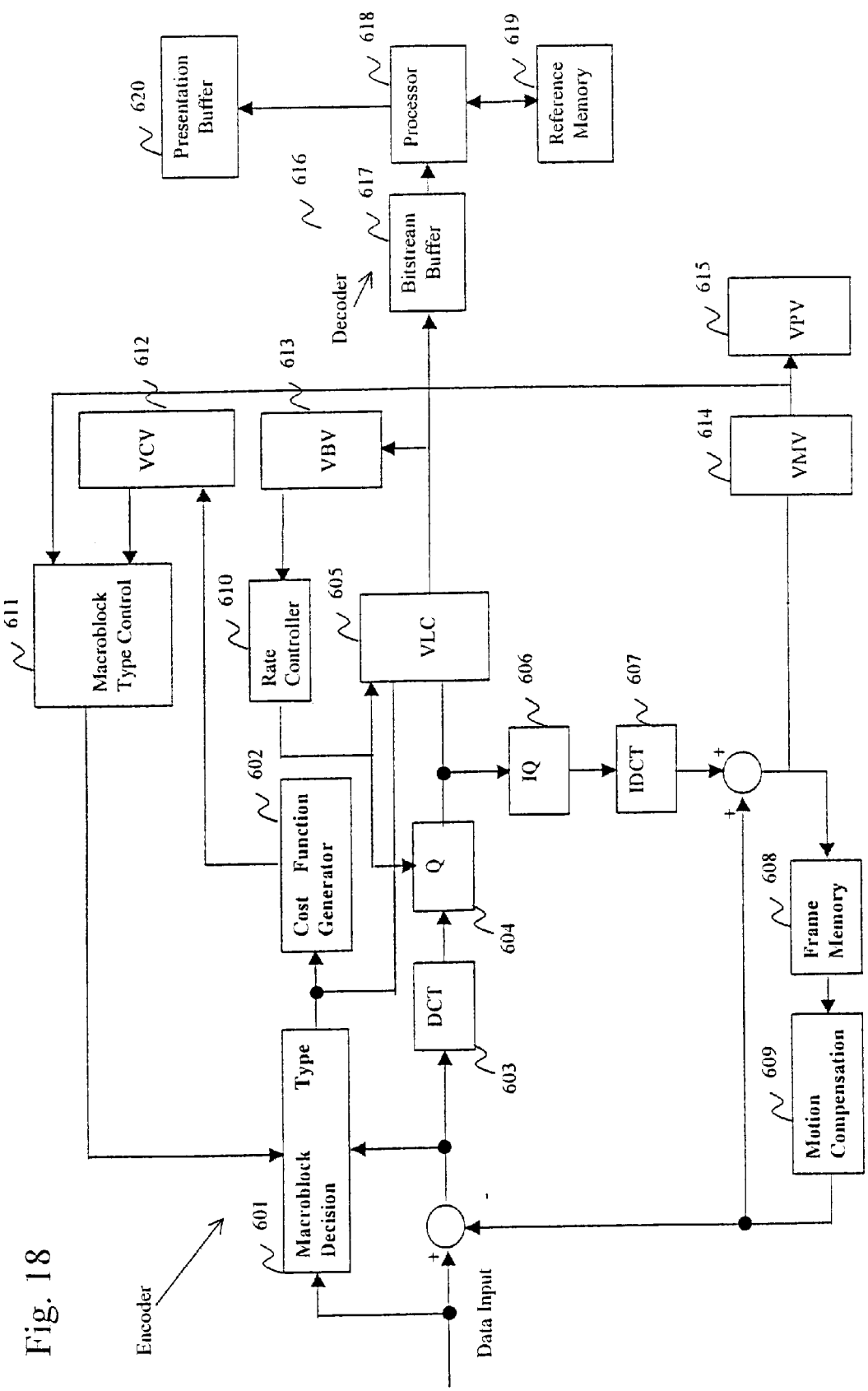
FIG. 18 is a block diagram of a video verifier model used in video encoder.

The video verifier model presented individually above can be combined to form a complete video verifier, FIG. 18 shows a complete solution including all the modules in the encoder. It shows the video verifier models and the various encoder modules that are controlled by the feedback mechanism of the verifier. The present invention of the video verifier models can be used in the video encoder and in the verification of pre-encoded video bitstream.

When used in a video encoder, the VBV model 613 is used to check the bitstream rate. If the rate is larger than the defined bound, a feedback signal will be sent to the Rate Controller 610 to control the quantization 604 and VLC 605. The VCV model 612 is used to check the complexity or the decoding cost of the generated bitstream. If the complexity is over the defined bound, a feedback signal will be sent to the Macroblock Type Controller 611 to control the Macroblock Type Decision 601. The VMV 614 and VPV 615 are used to check the reference memory 608 requirement. If it is overflowed, a feedback signal will be also sent to the Macroblock Type Controller 611 to change the Macroblock Type Decision 601.

Figure 19:
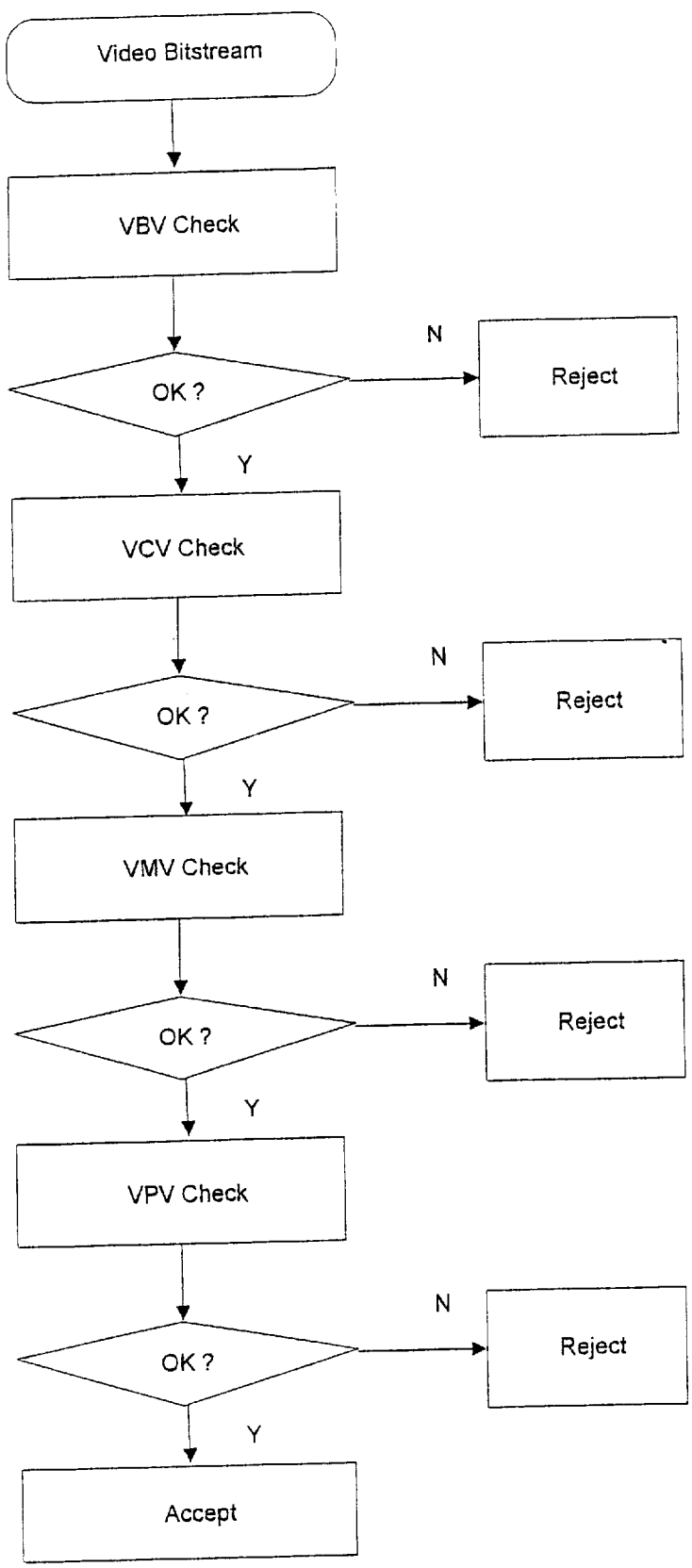
FIG. 19 is a flowchart of the video bitstream verification showing the operation of a standalone video bitstream verifier.

As show in FIG. 19 the verifier models can also be used to check the conformance of video bitstreams. With the flowchart, the video bitstream is checked with the VBV, VCV, VMV, and VPV one-by-one. If any of the bounds can not be satisfied, the bitstream is not compliant and must be rejected.

Third Embodiment

The third embodiment is a generalized cased of the present invention. It describes an example of a complete specification of the video verifier model. It is sectioned into the following definitions:

Video Buffer Model Definition

The video buffering verifier (VBV) is an algorithm for checking a bitstream with its delivery rate function, $R(t)$, to verify that the amount of rate buffer memory required in a decoder is less than the stated buffer size. Originated from MPEG-2, the new VBV is defined with new features of the object-oriented video coding. If a visual bitstream is composed of multiple Video Objects (VOs) each with one or more Video Object Layers (VOLs), the rate buffer model is applied independently to each VOL (using buffer size and rate functions particular to that VOL).

Figure 20:
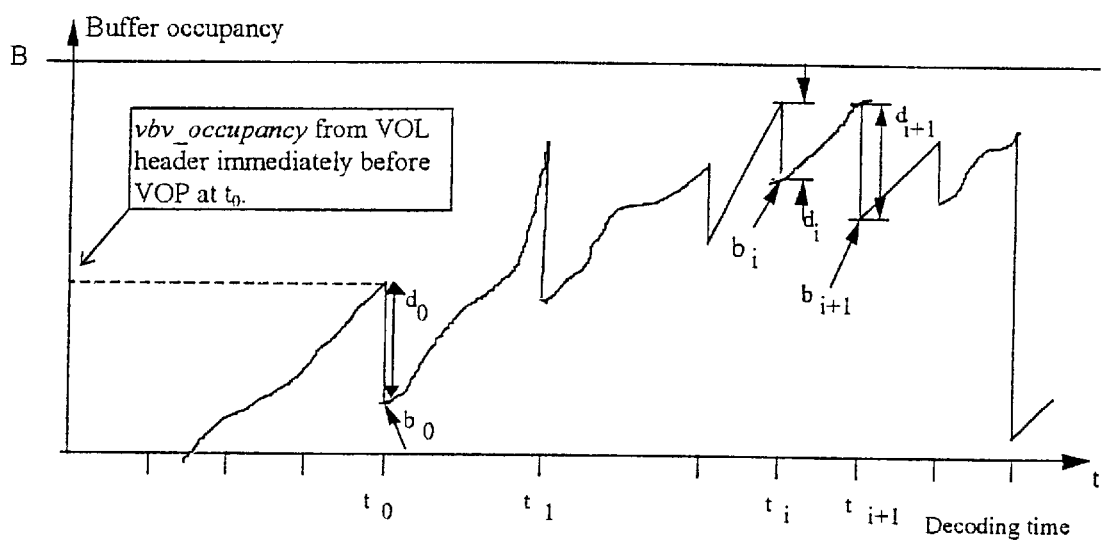
FIG. 20 is a graph showing a VBV buffer occupancy.

The VBV applies to natural video coded as a combination of Intra, Predicted and Bi-directional Video Object Planes (I, P and B-VOPs). The following section refers to FIG. 20. The coded video bitstream shall be constrained to comply with the requirements of the VBV defined as follows:

1. When the vbv_buffer_size and vbv_occupancy parameters are specified by systems-level configuration information, the bitstream shall be constrained according to the specified values. When the vbv_buffer_size and vbv_occupancy parameters are not specified (except in the short video header case as described below), this indicates that the bitstream should be constrained according to the default values of vbv_buffer_size and vbv_occupancy. The default value of vbv_buffer_size is the maximum value of vbv_buffer_size allowed within the profile and level. The default value of vbv_occupancy is 170×vbv_buffer_size, where vbv_occupancy is in 64-bit units and vbv_buffer_size is in 16384-bit units. This corresponds to an initial occupancy of approximately two-thirds of the full buffer size.

2. The VBV buffer size is specified by the vbv_buffer_size field in the VOL header in units of 16384 bits. A vbv_buffer_size of 0 is forbidden. Define B–16384× vbv_buffer_size to be the VBV buffer size in bits.

3. The instantaneous video object layer channel bit rate seen by the encoder is denoted by $R_{vol}(t)$ in bits per second. If the bit_rate field in the VOL header is present, it defines a peak rate (in units of 400 bits per second; a value of 0 is forbidden) such that $R_{vol}(t)<=$ 400×bit_rate Note that $R_{vol}(t)$ counts only visual syntax for the current VOL (refer to the definition of $d_i$ below). If the channel is a serial time mutiplex containing other VOLs or as defined by ISO/IEC 14496-1 with a total instantaneous channel rate seen by the encoder of $R(t)$, then $$R_{vol}(t) = \begin{cases} R(t) & \text{if } t \in \{\text{channel bit duration of a bit from VOL } vol\} \\ 0 & \text{otherwise} \end{cases}$$

4. The VBV buffer is initially empty. The vbv_occupancy field specifies the initial occupancy of the VBV buffer in 64-bit units before decoding the initial VOP. The first bit in the VBV buffer is the first bit of the elementary stream.

5. Define $d_i$ to be size in bits of the i-th VOP plus any immediately preceding GOV header, where i is the VOP index which increments by 1 in decoding order. A VOP includes any trailing stuffing code words before the next start code and the size of a coded VOP ($d_i$) is always a multiple of 8 bits due to start code alignment.

6. Let $t_i$ be the decoding time associated with VOP i in decoding order. All bits ($d_i$) of VOP i are removed from the VBV buffer instantaneously at $t_i$. This instantaneous removal property distinguishes the VBV buffer model from a real rate buffer. The method of determining the value of $t_i$ is defined in item 7 below.

7. $\tau_i$ is the composition time (or presentation time in a no-compositor decoder) of VOP i. For a video object plane, $\tau_i$ defined by vop_time_increment (in units of 1/vop_time_increment_resolution seconds) plus the cumulative number of whole seconds specified by module_time_base In the case of interlaced video, a VOP consists of lines from two fields and $\tau_i$ is the composition time of the first field. The relationship between the composition time and the decoding time for a VOP is given by:

$t_i = \tau_i$ if ((vop_coding_type of VOP i==B-VOP)∥low_delay∥scalability)

$t_i = \tau_i - m_i$ otherwise where low_delay is true ('1') if the elementary stream contains no B-VOPs. If low_delay is '0' and scalability is also '0', then the composition time of I and P VOP's is delayed until all immediately temporally-previous B-VOPs have been composed. This delay period is $m_i = \tau_f - \tau_p$, where f, for an I or P VOP is the index of the VOP itself, and for a B-VOP is the index of the nearest temporally-future non-B VOP relative to VOP i, and p is the index of the nearest temporally-previous non-B VOP relative to vop i. In order to initialize the model decoder when $m_i$ is needed for the first VOP, it is necessary to define an initial decoding time $t_0$ for the firs VOP (since the timing structure is locked to the B-VOP times and the first decoded VOP would not be a B-VOP). This defined decoding timing shall be that to $t_0 - 2t_1 - t_2$ (i.e., assuming that $t_1 - t_0 - t_2 - t_1$).

The following example demonstrates how $m_i$ is determined for a sequence with variable numbers of consecutive B-VOPs:

Decoding order: $I_0 P_1 P_2 P_3 B_4 P_5 B_6 P_7 B_8 B_9 P_{10} B_{11} B_{12}$

Presentation order: $I_0 P_1 P_2 B_4 P_3 B_6 P_5 B_8 B_9 P_7 B_{11} B_{12} P_{10}$ Assume that vop_time_increment=1 and modulo_time_base=0 in this example. The sub-index i is in decoding order.

TABLE 1

An example that demonstrates how $m_i$ is determined

| i | $\tau_i$ | $t_i$ | $m_i$ |
|---|---|---|---|
| 0 | 0 | 0 − 1 = −1 | 1 |
| 1 | 1 | 1 − 1 = 0 | 1 |
| 2 | 2 | 2 − 1 = 1 | 1 |
| 3 | 4 | 4 − 2 = 2 | 2 |
| 4 | 3 | 3 | 2 |
| 5 | 6 | 6 − 2 = 4 | 2 |
| 6 | 5 | 5 | 2 |
| 7 | 9 | 9 − 3 = 6 | 3 |
| 8 | 7 | 7 | 3 |
| 9 | 8 | 8 | 3 |
| 10 | 12 | 12 − 3 = 9 | 3 |
| 11 | 10 | 10 | 3 |
| 12 | 11 | 11 | 3 |

8. Define $b_i$ as the buffer occupancy in bits immediately following the removal of VOP i from the rate buffer. Using the above definitions, $b_i$ can be iteratively defined $$b_o = 64 \times vbv\_occupancy - d_o$$

$$b_{i+1} = b_i + \int_{t_i}^{t_{i+1}} R_{vol}(t)dt - d_{i+1} \quad \text{for } i \geq 0$$

9. The rate buffer model requires that the VBV buffer never overflow or underflow, that is $0 < b_i$ and $b_i + d_i < B$ for all $i$ Real-valued arithmetic is used to compute $b_i$ so that errors are not accumulated.
   A coded VOP size must always be less than the VBV buffer size, i.e., $d_i < B$ for all i.

10. If the short video header is in use (i.e., when short_video_header=1), then the parameter vbv_buffer_size is not present and the following conditions are required for VBV operation. The buffer is initially empty at the start of encoder operation (i.e., t=0 being at the time of the generation of the first video plane with short header), and its fullness is subsequently checked after each time interval of 1001/30000 seconds (i.e., at t=1001/30000, 2002/30000, etc.). If a complete video plane with short header is in the buffer at the checking time, it is removed. The buffer fullness after the removal of a VOP, $b_i$, shall be greater than zero and less than (4·Rmax·1001)/30000 bits, where Rmax is the maximum bit rate in bits per second allowed within the profile and level. The number of bits used for coding any single VOP, $d_i$, shall not exceed k·16384 bits, where k=4 for QCIF and Sub-QCIF, k=16 for CIF, k=32 for 4CIF, and k=64 for 16CIF, unless a larger value of k is specified in the profile and level definition. Furthermore, the total buffer fullness at any time shall not exceed a value of B=k·16384+(4·Rmax·1001)/30000.

It is a requirement on the encoder to produce a bitstream which does not overflow or underflow the VBV buffer. This means the encoder must be designed to provide correct VBV operation for the range of values of $R_{vol,decoder}(t)$ over which the system will operate for delivery of the bitstream. A channel has constant delay if the encoder bitrate at time t when particular bit enters the channel, $R_{vol,encoder}(t)$ is equal to $R_{vol,decoder}(t+L)$, where the bit is received at (t+L) and L is constant. In the case of constant delay channels, the encoder can use its locally estimated $R_{vol,encoder}(t)$ to simulate the VBV occupancy and control the number of bits per VOP, $d_i$, in order to prevent overflow or underflow.

The VBV model assumes a constant delay channel. This allows the encoder to produce an elementary bitstream which does not overflow or underflow the buffer using $R_{vol,encoder}(t)$—note that $R_{vol}(t)$ is defined as $R_{vol,encoder}(t)$ in item 2 above.

Video Complexity Model Definition

The video complexity verifier (VCV) is an algorithm for checking a bitstream to verify that the amount of processing capability required in a decoder is less than the stated complexity measure in cost function equivalent of I-MB/sec. If a visual bitstream is composed of multiple VOs each with one or more VOLs, the video complexity model is applied jointly for all VOLs (using one cumulative vcv_buffer_size for all the VOLs).

The VCV applies to natural video coded as a combination of I, P and B-VOPs. The coded video bitstream shall be constrained to comply with the requirements of the VCV defined as follows:

1. A vcv_buffer_size is defined as the number of equivalent I-MBs which can be contained in the VCV-buffer. These equivalent I-MBs are consumed by the decoder at the cost function equivalent I-MB decoding rate vcv_decoder_rate. A vcv_decoder_latency is defined as the processing time needed for the decoder to decode a full VCV-buffer (vcv_buffer_size MBs) with the MB-decoding rate (equivalent I-MB/s). Thus the relation vcv_buffer_size=vcv_decoder_latency*vcv_decoder_rate holds. The VCV-buffer is initially empty at the start of decoding.

2. When the vcv_decoder_latency parameter is specified by vol_control_parameters, the bitstream shall be constrained according to the specified values. When the vcv_decoder_latency parameter is not specified, the bitstream shall be constrained according to the default values of vcv_decoder_latency.

3. The complexity cost of a vop, $M_i$, in units of equivalent I-MB is calculated based on the following formula:
   $M_i$ is the new amount of macroblocks at time stamp $t_i$. $M_i$ can include I-, P- and B-macroblocks. The "decoding cost" for these macroblocks are based on the macroblock type and are given by the weights $w_i$, $w_P$, $w_B$, $w_{SI}$ and $w_{SP}$.

$$M_i = w_I \cdot W_{Ii} + w_P \cdot M_{Pi} + w_B \cdot M_{Bi} + w_{SI} \cdot M_{SIi} + w_{SP} \cdot M_{SPi}$$

where I, P and B refer respectively to I-, P- and B-macroblocks while SI and SP refer respectively to I- and P-macroblocks including object boundary (shape).

4. At time $t_i$−vcv_decoder_latency the complexity cost of the vop is added to the VCV-buffer, where $t_i$ is the decode time calculated in section 0.

5. The complexity model requires that the VCV buffer never overflows, that is the decoding process must be completed within the decoder latency time. In that case the only stringent requirement of the model is fulfilled: the decoding end time must be before the decoding time calculated in section 0. This constraint is always fulfilled if no VCV-buffer overflow occurs.

6. The complexity model allows the VCV buffer to underflow, in which case the decoder simply remains idle, while the VCV-buffer is empty.

Video Reference Memory Model Definition

The video memory verifier (VMV) is an algorithm for checking a bitstream to verify that the amount of reference memory required in a decoder is less than the stated maximum total reference memory in units of MB. If a visual bitstream is composed of multiple VOs each with one or more VOLs, the video reference memory model is applied jointly for all VOL (since this model assumes a shared memory space).

The VMV applies to natural video coded as a combination of I, P and B-VOPs. The coded video bitstream shall be constrained to comply with the requirements of the VMV defined as follows:

1. The reference memory is initially empty. It is filled with the decoded data as each macroblock is decoded.
2. The amount of reference memory required for the decoding of the $i^{th}$ vop is defined as the number of macroblocks in the vop, $n_i$, and is consumed at a constant rate during the decoding duration of the vop, $T_i$. The decoding duration of the $i^{th}$ vop, $T_i$, occurs between $s_i$ and $e_i$, where $s_i$ and $e_i$ are the decoding start time and the decoding end time of the $i^{th}$ vop and are obtained from the intersection of the decoder processing slope and the decode time axis of the VCV model in FIG. 21.
3. At the composition time (or presentation time in a no-compositor decoder), $\tau_i$, of an I- or P-VOP the total memory allocated to the previous I- or P-VOP in the decoding order is released instantaneously.
4. At the composition time (or presentation time in a no-compositor decoder), $\tau_i$, of a B-VOP the total memory allocated to that B-VOP is released instantaneously.
5. The reference memory model requires that the VMV buffer never overflows.

Figure 21:
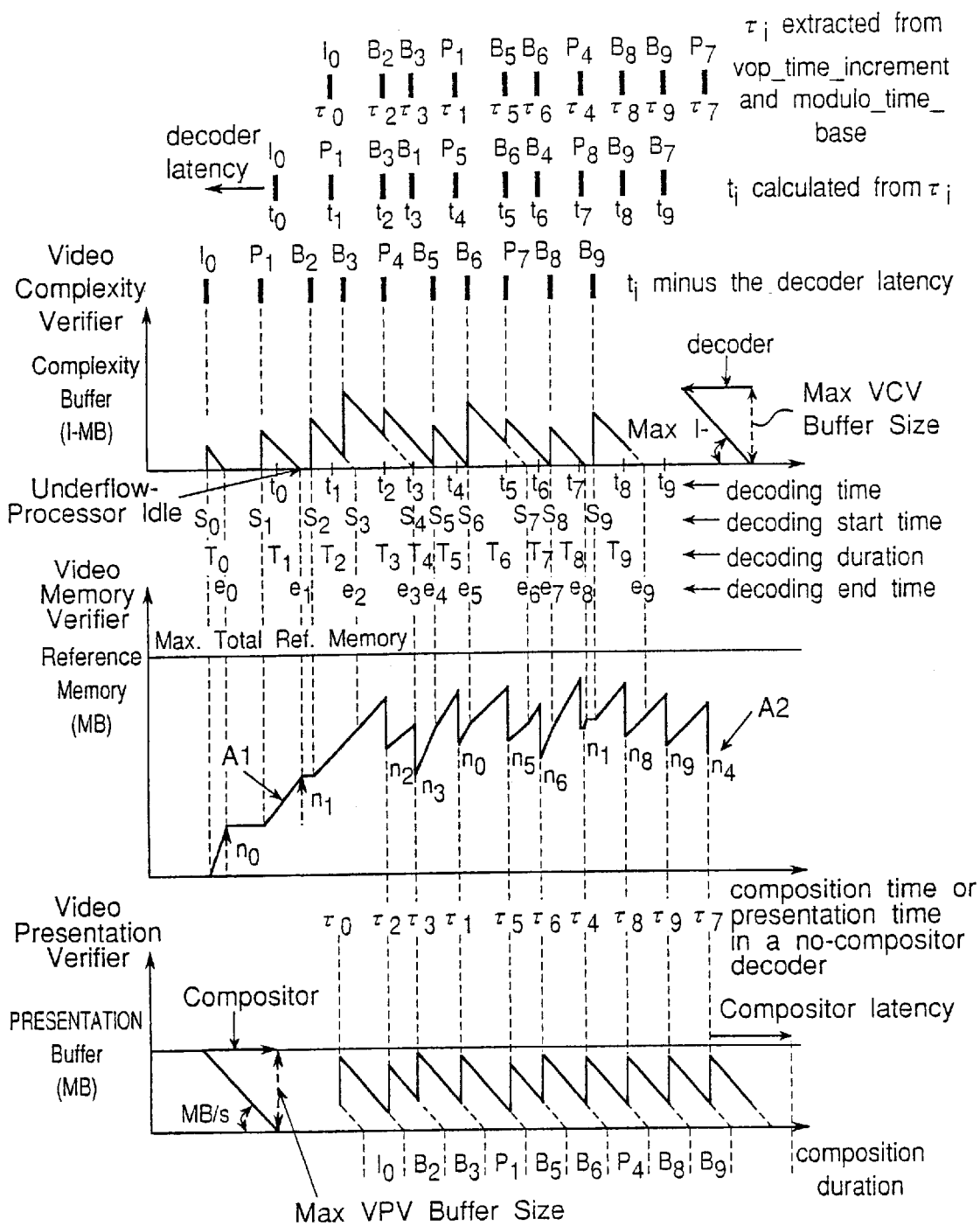
FIG. 21 is a graph showing VCV, VMV and VPV buffer occupancy.

The buffer occupancy of the video memory verifier is shown in FIG. 21. In FIG. 21, arrow A1 points a place where the reference memory is consumed during decoding period, and arrow A2 points a place where the reference memory released at composition time or presentation time in a no-compositor decoder.

Interaction Between VBV, VCV and VMV.

The rate buffer model defines when the bitstream is available for the decoding and is removed from the buffer. The complexity model defines the speed at which the macroblocks are decoded. The reference memory model defines the amount of reference memory that is consumed and released. Obviously, it is advantageous for the video decoder to decode as far in advance as possible. However, this is constraint by the VBV and the VMV. The decoder can only start decoding if the bits are available for decoding. At the same time as the decoder decodes the bitstream, it generates macroblocks which consumes the reference memory. So if it decodes too fast it will overflow the reference memory.

On the other hand if the decoder start decoding too late, then it will not be able to complete the decoding in time and the bitstream will be removed from the VBV before it could be processed. Similarly the reference memory required for the prediction of the current VOP may also be removed from the VMV.

Therefore, the encoder will have to adjust the vbv_buffer_size, vbv_occupancy and vcv_decoder_latency parameters such that the resulting bitstream does not violate any of the VBV, VCV and VMV models. Besides adjusting these parameters, the encoder can also adaptively adjust its encoding parameters such that the resulting bitstream does not violate the models.

Video Presentation Model Definition

The video presentation verifier (VPV) is an algorithm for checking a bitstream to verify that the amount of presentation buffer required in a decoder is less than a given amount of memory in units of MB. It is also used to constraint the speed of the compositor in terms of maximum number of MB/sec.

The VPV operates in the same manner as the VCV:

1. At the composition time of the $i^{th}$ VOP, $\tau_i$, the VOP is placed in the presentation buffer.
2. The data in the presentation buffer is consumed by the compositor at a rate equivalent to the maximum number of MB/sec.
3. At $\tau_i$+compositor_latency the VOP should be composited.
4. The presentation memory model requires that the VPV buffer never overflows With the third embodiment of the present invention, the encoder is capable of controlling and regulating the complexity of the coded bitstreams that it generates. At the same time, the decoder is ensured that streams that are too complex will not be created. The effect of this invention is that the design of the decoders no longer have to be based on the worse case scenario but based on the common complexity measure that is specified by the standard. The cost of these products can therefore be reduced, as there is no need for over engineering.

The present disclosure relates to subject matter contained in priority Japanese Patent Application Nos. HEI 10-328767, filed on Oct. 13, 1998, and HEI 11-41406, filed on Feb. 19, 1999, the contents of both being herein expressly incorporated by reference in their entireties.

What is claimed is:

1. A method for regulating the computational and memory requirements of a compressed video bitstream comprising:
    partitioning a picture into a plurality of macroblocks;
    encoding the macroblocks with different encoding types into a bitstream;
    calculating a cost function of the bitstream based on the encoding type of the macroblocks;
    applying the cost function to a virtual decoder;
    adjusting a decoding time stamp of the picture for optimal distribution of the cost function;
    deriving a set of weight factors; and
    applying the weight factors to regulate a future decision on the encoding type.

2. The method as in claim 1, wherein the virtual decoder operates according to the following rules:
    a) an amount of memory for decoding that stores a current video object plane is defined by a number of macroblocks in a video object plane and is consumed at a constant rate between decoding time stamp times of the current video object plane and a next video object plane;
    b) at a presentation time of an intra or predicted video object plane a total memory allocated to a previous intra or predicted video object plane in decoding order is released instantaneously;
    c) at a presentation time of a bi-directional video object plane, the total memory allocated to the bi-directional video object plane is released instantaneously;
    d) at any time, the decoding time stamp of the $(n+1)^{th}$ video object plane in decoding order, decoding time stamp$_{n+1}$, must be less than or equal to the presentation time stamp of the n$^{th}$ video object plane in decoding order, presentation time stamp$_n$;

e) at any time, the sum of the memory consumed must not exceed maximum memory resources available; and f) at any time, a ratio of a decoding complexity of the current video object plane to a decoding time available, decoding time stamp$_{n+1}$—decoding time stamp$_n$, must be less than maximum complexity resources available per second.

3. A method of ensuring the validity of a video bitstream including the method of claim 2, wherein values in the bitstream must satisfy the rules of d), e) and f), and do not cause the virtual decoder to overflow in any one of memory and complexity resources.

4. A method of calculating the cost function of a bitstream based on an encoding type of the macroblock including the method of claim 1, wherein the encoding type of the macroblock comprises intra coding, predictive coding, bi-directional coding, predictive coding with overlap block motion compensation, intra coding with boundary shape decoding, and predictive coding with boundary shape decoding, and the cost function is a normalized weighted sum of a cost of decoding each encoding type present in the bitstream.

5. A method for adjusting the decoding time stamp of pictures in a bitstream including the method of claim 1, wherein the decoding time stamp of several pictures is optimized such that the pictures are decoded in a shortest time, subject to an availability of computational and memory resources in the virtual decoder.

6. The method of claim 1, wherein the bitstream comprises at least one of video bits and other data bits.

7. A method for verifying computational and memory requirements of a compressed video bitstream being generated do not exceed a predefined limit of an encoder comprising:

obtaining decoding time stamps, presentation time stamps, and encoding types of macroblocks;

calculating a cost function of the bitstream based on the encoding type of the macroblocks;

applying the cost function to a virtual decoder operating according to following rules:

a) an amount of memory for decoding that stores a current video object plane is defined by a number of macroblocks in the video object plane and is consumed at a constant rate between decoding time stamp times of the current video object plane and a next video object plane;

b) at a presentation time of an intra or predicted video object plane a total memory allocated to a previous intra or predicted video object plane in decoding order is released instantaneously;

c) at a presentation time of a bi-directional video object plane the total memory allocated to the bidirectional video object plane is released instantaneously;

d) at any time, the decoding time stamp of the (n+1)$^{th}$ video object plane in decoding order, decoding time stamp$_{n+1}$, must be less than or equal to the presentation time stamp of the n$^{th}$ video object plane in decoding order;

e) at any time, a sum of the memory consumed must not exceed maximum memory resources available; and f) at any time, a ratio of a decoding complexity of the current video object plane to the decoding time available, decoding time stamp$_{n+1}$—decoding time stamp$_n$, must be less than maximum complexity resources available per second; and verifying that the decoding time stamps, the presentation time stamps, and the cost function satisfy the rules d), e), and f).

8. A method for verifying computational and memory requirements of a compressed video bitstream do not exceed a predefined limit, by a virtual complexity verifier attached to an output of an encoder, comprising:

parsing the bitstream at the output of the encoder to obtain decoding time stamps, presentation time stamps, and encoding types of macroblocks;

calculating a cost function of the bitstream based on the encoding type of the macroblocks;

applying the cost function to a virtual decoder implementing following rules:

a) an amount of memory for decoding that stores a current video object plane is defined by a number of macroblocks in a video object plane and is consumed at a constant rate between decoding time stamp times of the current video object plane and a next video object plane;

b) at a presentation time of an intra or predicted video object plane a total memory allocated to a previous intra or predicted video object plane in decoding order is released instantaneously;

c) at a presentation time of a bi-directional video object plane the total memory allocated to the bi-directional video object plane is released instantaneously; and verifying that the decoding time stamps, the presentation time stamps, and cost function satisfy below following rules:

d) at any time, the decoding time stamp of the (n+1)$^{th}$ video object plane in decoding order, decoding time stamp$_{n+1}$, must be less than or equal to the presentation time stamp of the n$^{th}$ video object plane in decoding order;

e) at any time, a sum of the memory consumed must not exceed maximum memory resources available; and f) at any time, a ratio of a decoding complexity of the current video object plane to a decoding time available, decoding time stamp$_{n+1}$—decoding time stamp$_n$, must be less than maximum complexity resources available per second.

9. An apparatus that executes the verification method of claim 7 comprising:

a decoding time stamp generator;

a presentation time stamp generator;

a macroblock encoding type generator;

a cost function generator that calculates the cost function;

a virtual memory buffer that measures the memory consumed; and a presentation time stamp and decoding time stamp verifier.

10. An apparatus that executes the verification method of claim 8 comprising:

a bitstream parser that extracts the decoding time stamp, the presentation time stamps, and the encoding types of the macroblocks;

a cost function generator that calculates the cost function;

a virtual memory buffer that measures the memory consumed, and a presentation time stamp verifier and a decoding time stamp verifier.

11. A method for simulating a processor and reference memory of a compressed video bitstream decoder, the method comprising:
 modeling a storage required for keeping pictures until no longer required by the decoder; and
 modeling a processing time required for decoding pictures stored in a compressed bitstream the processing time modeling comprising:
  separating a decoding of the bitstream into a plurality of decoding units;
  addressing decoding requirements of the decoding units by a virtual decoder capable of processing the decoding units at a given decoding rate;
  determining a start time of the decoding of the picture; and determining an end time of the decoding of the picture.

12. A method for simulating a processor and reference memory of a compressed video bitstream decoder, the method comprising:
 modeling a storage required for keeping pictures until no longer required by the decoder; and
 modeling a processing time required for decoding pictures stored in a compressed bitstream, the processing time modeling comprising:
  separating a decoding of the bitstream into a plurality of decoding units;
  classifying the decoding units into a plurality of categories;
  associating a weighting factor with each of the categories;
  calculating decoding requirements of the decoding units based on the categories and each weighting factor in units of cost factor equivalents;
  addressing decoding requirements by a virtual decoder capable of processing the units of cost factor equivalents at a given decoding rate;
  determining a start time of the decoding of the picture; and
  determining an end time of the decoding of the picture.

13. A method for simulating a processor and reference memory of a compressed video bitstream decoder, the method comprising:
 modeling a storage required for keeping pictures until no longer required by the decoder; and
 modeling a processing time required for decoding pictures stored in a compressed bitstream, the processing time modeling comprising:
  separating a decoding of the bitstream into a plurality of decoding units;
  accumulating decoding requirements of the decoding units in a buffer;
  addressing accumulated decoding requirements by a virtual decoder capable of processing the decoding units at a given decoding rate;
  determining a start time of the decoding of the picture; and
  determining an end time of the decoding of the picture.

14. A method for simulating a processor and reference memory of a compressed video bitstream decoder the method comprising:
 modeling a storage required for keeping pictures until no longer required by the decoder; and
 modeling a processing time required for decoding pictures stored in a compressed bitstream, the processing time modeling comprising:
  separating a decoding of the bitstream into a plurality of decoding units;
  classifying the decoding units into a plurality of categories;
  associating a weighting factor with each of the categories;
  calculating decoding requirements of the decoding units based on the categories and each weighting factor in units of cost factor equivalents;
  accumulating the decoding requirements in a buffer;
  addressing said accumulated decoding requirements by a virtual decoder capable of processing the units of cost factor equivalents at a given decoding rate;
  determining a start time of the decoding of the picture, and
  determining an end time of the decoding of the picture.

15. The method of claim 11, wherein said start time determining further comprises:
 determining a decoder latency of said compressed bitstream;
 determining a presentation time stamp of the picture;
 determining a picture reordering delay of the picture;
 calculating a candidate start time by subtracting the decoder latency and the picture reordering delay from the presentation time stamp; and
 selecting as the start time, the larger value of the candidate start time and the end time of an immediately preceding picture.

16. The method in claim 11, wherein the end time determining further comprises:
 summing decoding periods of the decoding units belonging to the picture;
 dividing a result of the summing by the decoding rate; and
 adding a result of the dividing to the start time to obtain the end time.

17. A method for simulating a processor and reference memory of a compressed video bitstream decoder the method comprising:
 modeling a processing time required for decoding pictures stored in a compressed bitstream; and
 modeling a storage required for keeping said pictures until no longer required by the decoder, the storage modeling comprising:
  consuming the storage at a given consumption rate during a period between the start time and the end time;
  releasing the storage occupied by the picture at the presentation time stamp time of the picture.

18. A method for simulating a processor and reference memory of a compressed video bitstream decoder, the method comprising:
 modeling a processing time required for decoding pictures stored in a compressed bitstream; and
 modeling a storage required for keeping the pictures until no longer required by the decoder, the storage modeling comprising:
  consuming the storage at a given consumption rate during a period between the start time and the end time;
  classifying the pictures into two categories;
  releasing the storage occupied by the picture of a first category upon a presentation time stamp of the picture;
  releasing the storage occupied by the picture of a second category upon a presentation time stamp of an immediately preceding picture belonging to a same second category as the picture.

19. The method in claim 15, wherein the decoder latency determining further comprises:
   extracting a decoder latency parameter from the compressed bitstream.

20. The method of claim 17, wherein the storage is initially empty.

21. An apparatus that models a processing time and storage requirements of decoding a compressed video bitstream, the apparatus comprising:
   a storage modeler that models a storage required for keeping pictures until no longer required by a decoder and a presenter; and
   a processing time modeler that models a processing time required for decoding pictures stored in the compressed bitstream, the processing time modeler comprising:
      a decoding separator that separates the decoding of the bitstream into a plurality of decoding units;
      an addresser that addresses decoding requirements of the decoding units by a virtual decoder capable of processing the decoding units at a given decoding rate;
      a start time determiner that determines a start time of the decoding of the picture; and
      an end time determiner that determines an end time of the decoding of the picture.

22. An apparatus that models a processing time and storage requirements of decoding a compressed video bitstream, the apparatus comprising:
   a storage modeler that models a storage required for keeping pictures until no longer required by a decoder and a presenter; and
   a processing time modeler that models a processing time required for decoding pictures stored in the compressed bitstream, the processing time modeler comprising:
      a decoding separator that separates the decoding of the bitstream into a plurality of decoding units;
      a decoding classifier that classifies the decoding units into a plurality of categories;
      a weighting factor associator that associates a weighting factor to each of the categories;
      a calculator that calculates decoding requirements of the decoding units based on the classified categories and each associated weighting factor in units of cost factor equivalents;
      an addresser that addresses the decoding requirements by a virtual decoder capable of processing the units of cost factor equivalents at a given decoding rate;
      a start time determiner that determines a start time of the decoding of the picture; and
      an end time determiner that determines an end time of the decoding of the picture.

23. An apparatus that models processing time and storage requirements of decoding a compressed video bitstream, the apparatus comprising:
   a storage modeler that models a storage required for keeping pictures until no longer required by a decoder and a presenter; and
   a processing time modeler that models a processing time required for decoding pictures stored in the compressed bitstream, the processing time modeler comprising:
      a decoding separator that separates the decoding of the bitstream into a plurality of decoding units;
      an accumulator that accumulates decoding requirements of the decoding units in a buffer;
      an addresser that addresses the accumulated decoding requirements by a virtual decoder capable of processing the decoding units at a given decoding rate;
      a start time determiner that determines a start time of the decoding of the picture; and
      an end time determiner that determines an end time of the decoding of the picture.

24. An apparatus that models a processing time and storage requirements of decoding a compressed video bitstream, the apparatus comprising:
   a storage modeler that models a storage required for keeping pictures until no longer required by a decoder and a presenter; and
   a processing time modeler that models a processing time required for decoding pictures stored in the compressed bitstream, the processing time modeler comprising:
      a decoding separator that separates the decoding of the bitstream into a plurality of decoding units;
      a classifier that classifies the decoding units into a plurality of categories;
      a weighting factor associator that associates a weighting factor to each of the categories;
      a calculator that calculates decoding requirements of the decoding units based on each of the classified categories and each of the associated weighting factors in units of cost factor equivalents;
      an accumulator that accumulates the calculated decoding requirements in a buffer;
      an addresser that addresses the accumulated decoding requirements by a virtual decoder capable of processing the units of cost factor equivalents at a given decoding rate;
      a start time determiner that determines a start time of the decoding of the picture; and
      an end time determiner that determines an end time of the decoding of the picture.

25. The apparatus in claim 21, wherein the start time determiner further comprises:
   a latency determiner that determines a decoder latency of the compressed bitstream and extracts a decoder latency parameter from the compressed bitstream;
   a time stamp determiner that determines a presentation time stamp of the picture;
   a delay determiner that determines a picture reordering delay of the picture;
   a calculator that calculates a candidate start time by subtracting the decoder latency and the picture reordering delay from the presentation time stamp; and
   a selector that selects as the start time, a larger value of the candidate start time and the end time of an immediately preceding picture.

26. The apparatus in claim 21, wherein the end time determiner further comprises:
   a summer that sums decoding periods of the decoding units belonging to the picture;
   a divider that divides a result of the summer by the decoding rate; and
   an adder that adds a result of the divider to the start time to obtain the end time.

27. An apparatus that models a processing time and storage requirements of decoding a compressed video bitstream, the apparatus comprising:
   a processing time modeler that models a processing time required for decoding pictures stored in the compressed bitstream; and
   a storage modeler that models a storage required for keeping the pictures until no longer required by a decoder and a presenter, the storage modeler comprising:

a storage consumer that consumes the storage at a given consumption rate during a period between a start time and an end time; and a storage releaser that releases said storage occupied by said picture at a presentation time stamp time of the picture.

28. An apparatus that models a processing time and storage requirements of decoding a compressed video bitstream, the apparatus comprising:

a processing time modeler that models a processing time required for decoding pictures stored in the compressed bitstream; and a storage modeler that models a storage required for keeping the pictures until no longer required by a decoder and a presenter, the storage modeler comprising:

a storage consumer that consumes the storage at a predetermined consumption rate during a period between a start time and an end time;

a classifier that classifies the pictures into two categories;

a storage releaser that releases the storage occupied by the picture of a first category at a presentation time stamp time of the picture; and a storage releaser that releases the storage occupied by the picture of a second category at the presentation time stamp time of an immediately preceding picture belonging to the second category as the picture.

* * * * *

UNITED STATES PATENT AND TRADEMARK OFFICE
CERTIFICATE OF CORRECTION

PATENT NO. : 6,542,549 B1  Page 1 of 1
DATED : April 1, 2003
INVENTOR(S) : T. Keng Tan and Guo Rong Hu It is certified that error appears in the above-identified patent and that said Letters Patent is hereby corrected as shown below:

Title page,
Item [30], Foreign Application Priority Data, "10-041406" should be -- 11-41406 --.
Item [56], References Cited, FOREIGN PATENT DOCUMENTS, "97/17492" should be -- 96/17492 --.

Signed and Sealed this

Ninth Day of September, 2003

JAMES E. ROGAN
*Director of the United States Patent and Trademark Office*